US012782650B2

(12) United States Patent
Yu et al.

(10) Patent No.: US 12,782,650 B2
(45) Date of Patent: Nov. 3, 2026

(54) OPTICAL DEVICE AND METHOD OF MANUFACTURE

(71) Applicant: Taiwan Semiconductor Manufacturing Co., Ltd., Hsinchu (TW)

(72) Inventors: Chen-Hua Yu, Hsinchu (TW); Tung-Liang Shao, Hsinchu (TW); Yi-Jan Lin, Hsinchu (TW); Yu-Sheng Huang, Hemei Township (TW); Tsung-Fu Tsai, Changhua City (TW); Chao-Jen Wang, Hsinchu (TW); Szu-Wei Lu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 276 days.

(21) Appl. No.: 18/543,459

(22) Filed: Dec. 18, 2023

(65) Prior Publication Data

US 2025/0076594 A1 Mar. 6, 2025

Related U.S. Application Data

(60) Provisional application No. 63/608,012, filed on Dec. 8, 2023, provisional application No. 63/535,402, filed on Aug. 30, 2023.

(51) Int. Cl.
*G02B 6/42* (2006.01)
*G02B 6/12* (2006.01)
*G02B 6/13* (2006.01)

(52) U.S. Cl.
CPC ....... *G02B 6/4214* (2013.01); *G02B 6/12004* (2013.01); *G02B 6/13* (2013.01); *G02B 2006/12102* (2013.01); *G02B 2006/12104* (2013.01)

(58) Field of Classification Search
CPC .... G02B 6/4214; G02B 6/12004; G02B 6/13; G02B 2006/12102; G02B 2006/12104
USPC ............................................................ 385/14
See application file for complete search history.

(56) References Cited

U.S. PATENT DOCUMENTS 9,831,215 B1 11/2017 Chen et al.
9,904,058 B2 2/2018 Yeoh et al.
2002/0028045 A1* 3/2002 Yoshimura .......... H10W 70/093 385/39
2010/0144084 A1* 6/2010 Doan ................ G02B 6/12004 257/E31.127
2020/0067173 A1* 2/2020 Chuang .................. H01L 23/66
2023/0161120 A1 5/2023 Yu et al.

FOREIGN PATENT DOCUMENTS

KR 20190102953 A 9/2019
KR 20230088520 A 6/2023
TW 201806091 A 2/2018

* cited by examiner

*Primary Examiner* — Jerry M Blevins
(74) *Attorney, Agent, or Firm* — Slater Matsil, LLP

(57) ABSTRACT

Optical devices and methods of manufacture are presented in which a multi-tier connector is utilized to transmit and receive optical signals to and from an optical device. In embodiments a multi-tier connection unit receives optical signals from outside of an optical device, wherein the optical signals are originally in multiple levels. The multi-tier connection unit then routes the optical signals into a single level of optical components.

20 Claims, 25 Drawing Sheets

OPTICAL DEVICE AND METHOD OF MANUFACTURE

PRIORITY CLAIM AND CROSS-REFERENCE

This application claims the benefit of U.S. Provisional Application No. 63/535,402, filed on Aug. 30, 2023, entitled “Fan-In Si FAU Assembly for Multi-Row Fibers, and Edge Coupling with High Beachfront Density,” and U.S. Provisional Application No. 63/608,012, filed on Dec. 8, 2023, entitled “Optical Device and Method of Manufacture,” which applications are hereby incorporated herein by reference.

BACKGROUND

Electrical signaling and processing is one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating long-range optical components and short-range electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
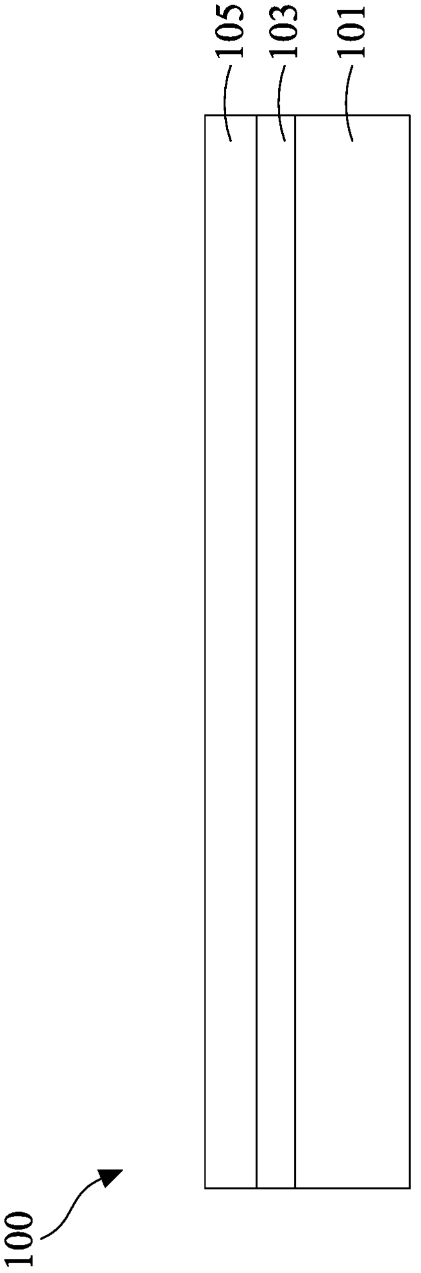
FIGS. 1-9 illustrate formation of a first optical package, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will now be discussed with respect to certain embodiments in which a multi-tier connector is utilized to provide multiple inputs into an optical device. The embodiments presented, however, are intended to be illustrative and are not intended to limit the ideas presented to the precise embodiments described. Rather, the ideas presented may be incorporated into a wide variety of embodiments, and all such embodiments may be included within the overall scope of the disclosure.

With reference now to FIG. 1, there is illustrated an initial structure of an optical interposer 100 (seen in FIG. 5), in accordance with some embodiments. In the particular embodiment illustrated in FIG. 1, the optical interposer 100 is a photonic integrated circuit (PIC) and comprises at this stage a first substrate 101, a first insulator layer 103, and a layer of material 105 for a first active layer 201 of first optical components 203 (not separately illustrated in FIG. 1 but illustrated and discussed further below with respect to FIG. 2). In an embodiment, at a beginning of the manufacturing process of the optical interposer 100, the first substrate 101, the first insulator layer 103, and the layer of material 105 for the first active layer 201 of first optical components 203 may collectively be part of a silicon-on-insulator (SOI) substrate. Looking first at the first substrate 101, the first substrate 101 may be a semiconductor material such as silicon or germanium, a dielectric material such as glass, or any other suitable material that allows for structural support of overlying devices.

The first insulator layer 103 may be a dielectric layer that separates the first substrate 101 from the overlying first active layer 201 and can additionally, in some embodiments, serve as a portion of cladding material that surrounds the subsequently manufactured first optical components 203 (discussed further below). In an embodiment the first insulator layer 103 may be silicon oxide, silicon nitride, germanium oxide, germanium nitride, combinations of these, or the like, formed using a method such as implantation (e.g., to form a buried oxide (BOX) layer) or else may be deposited onto the first substrate 101 using a deposition method such as chemical vapor deposition, atomic layer deposition, physical vapor deposition, combinations of these, or the like. However, any suitable material and method of manufacture may be used.

The material 105 for the first active layer 201 is initially (prior to patterning) a conformal layer of material that will be used to begin manufacturing the first active layer 201 of the first optical components 203. In an embodiment the material 105 for the first active layer 201 may be a translucent material that can be used as a core material for the desired first optical components 203, such as a semiconductor material such as silicon, germanium, silicon germanium, combinations of these, or the like, while in other embodiments the material 105 for the first active layer 201 may be a dielectric material such as silicon nitride or the like, although in other embodiments the material 105 for the first active layer 201 may be III-V materials, lithium niobate materials, or polymers. In embodiments in which the material 105 of the first active layer 201 is deposited, the material 105 for the first active layer 201 may be deposited using a method such as epitaxial growth, chemical vapor deposition, atomic layer deposition, physical vapor deposition, combinations of these, or the like. In other embodiments in which the first insulator layer 103 is formed using an implantation method, the material 105 of the first active layer 201 may initially be part of the first substrate 101 prior to the implantation process to form the first insulation layer 103. However, any suitable materials and methods of manufacture may be utilized to form the material 105 of the first active layer 201.

Figure 2:
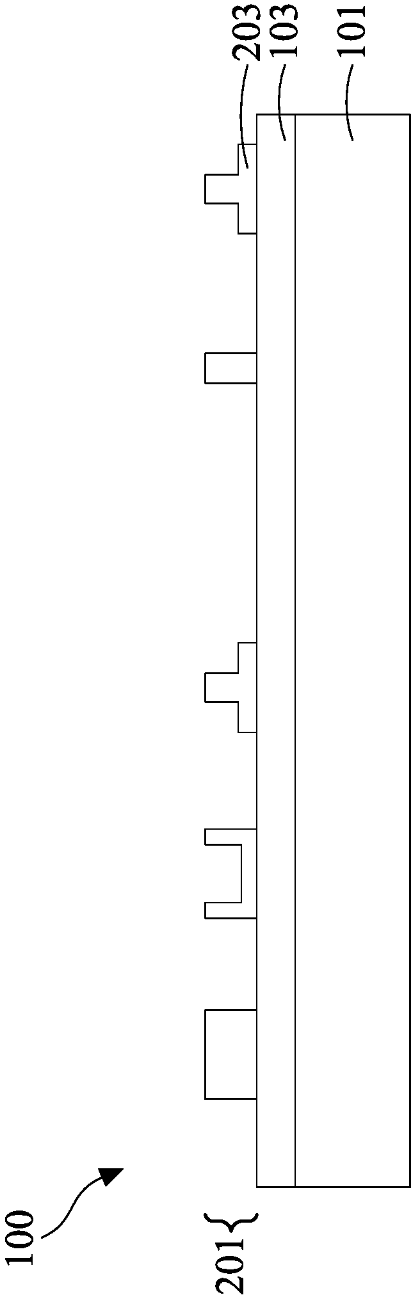

FIG. 2 illustrates that, once the material 105 for the first active layer 201 is ready, the first optical components 203 for the first active layer 201 are manufactured using the material 105 for the first active layer 201. In embodiments the first optical components 203 of the first active layer 201 may include such components as optical waveguides (e.g., ridge waveguides, rib waveguides, buried channel waveguides, diffused waveguides, etc.), couplers (e.g., grating couplers, edge couplers that are a narrowed waveguide with a width of between about 1 nm and about 200 nm, etc.), directional couplers, optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable first optical components 203 may be used.

To begin forming the first active layer 201 of first optical components 203 from the initial material, the material 105 for the first active layer 201 may be patterned into the desired shapes for the first active layer 201 of first optical components 203. In an embodiment the material 105 for the first active layer 201 may be patterned using, e.g., one or more photolithographic masking and etching processes. However, any suitable method of patterning the material 105 for the first active layer 201 may be utilized. For some of the first optical components 203, such as waveguides or edge couplers, the patterning process may be all or at least most of the manufacturing that is used to form these first optical components 203.

Figure 3:
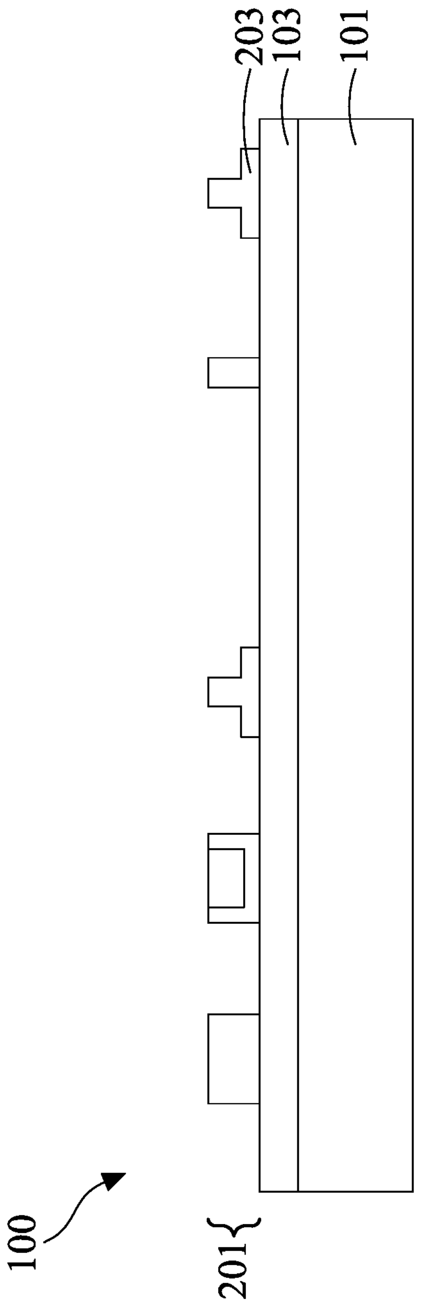

FIG. 3 illustrates that, for those components that utilize further manufacturing processes, such as Mach-Zehnder silicon-photonic switches that utilize resistive heating elements, additional processing may be performed either before or after the patterning of the material for the first active layer 201. For example, implantation processes, additional deposition and patterning processes for different materials (e.g., resistive heating elements, III-V materials for converters), combinations of all of these processes, or the like, can be utilized to help further the manufacturing of the various desired first optical components 203. In a particular embodiment, and as specifically illustrated in FIG. 3, in some embodiments an epitaxial deposition of a semiconductor material 301 such as germanium (used, e.g., for electricity/optics signal modulation and transversion) may be performed on a patterned portion of the material 105 of the first active layer 201. In such an embodiment the semiconductor material 301 may be epitaxially grown in order to help manufacture, e.g., a photodiode for an optical-to-electrical converter. All such manufacturing processes and all suitable first optical components 203 may be manufactured, and all such combinations are fully intended to be included within the scope of the embodiments.

Figure 4:
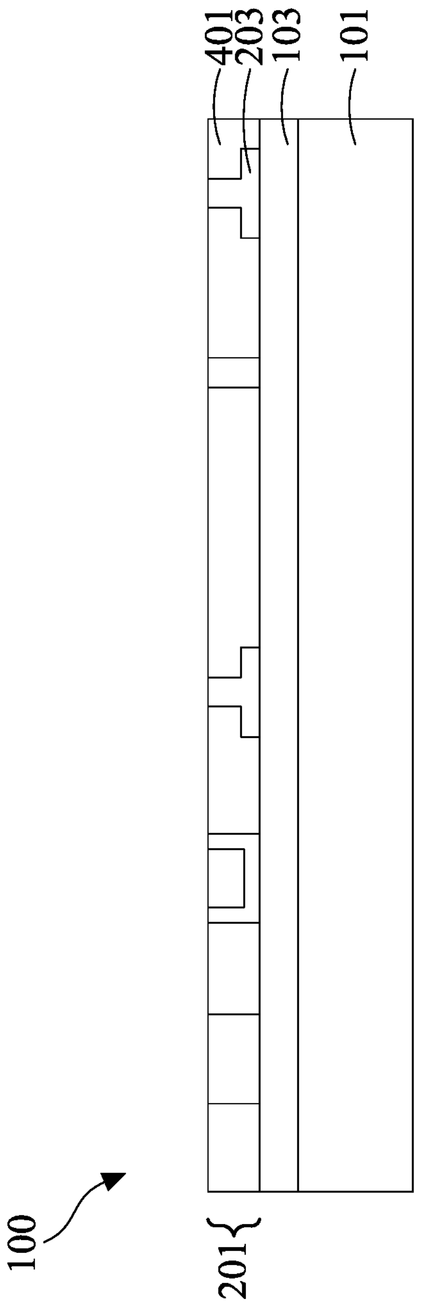

FIG. 4 illustrates that, once the individual first optical components 203 of the first active layer 201 have been formed, a second insulator layer 401 may be deposited to cover the first optical components 203 and provide additional cladding material. In an embodiment the second insulator layer 401 may be a dielectric layer that separates the individual components of the first active layer 201 from each other and from the overlying structures and can additionally serve as another portion of cladding material that surrounds the first optical components 203. In an embodiment the second insulator layer 401 may be silicon oxide, silicon nitride, germanium oxide, germanium nitride, combinations of these, or the like, formed using a deposition method such as chemical vapor deposition, atomic layer deposition, physical vapor deposition, combinations of these, or the like. Once the material of the second insulator layer 401 has been deposited, the material may be planarized using, e.g., a chemical mechanical polishing process in order to either planarize a top surface of the second insulator layer 401 (in embodiments in which the second insulator layer 401 is intended to fully cover the first optical components 203) or else planarize the second insulator layer 401 with top surfaces of the first optical components 203. However, any suitable material and method of manufacture may be used.

Figure 5:
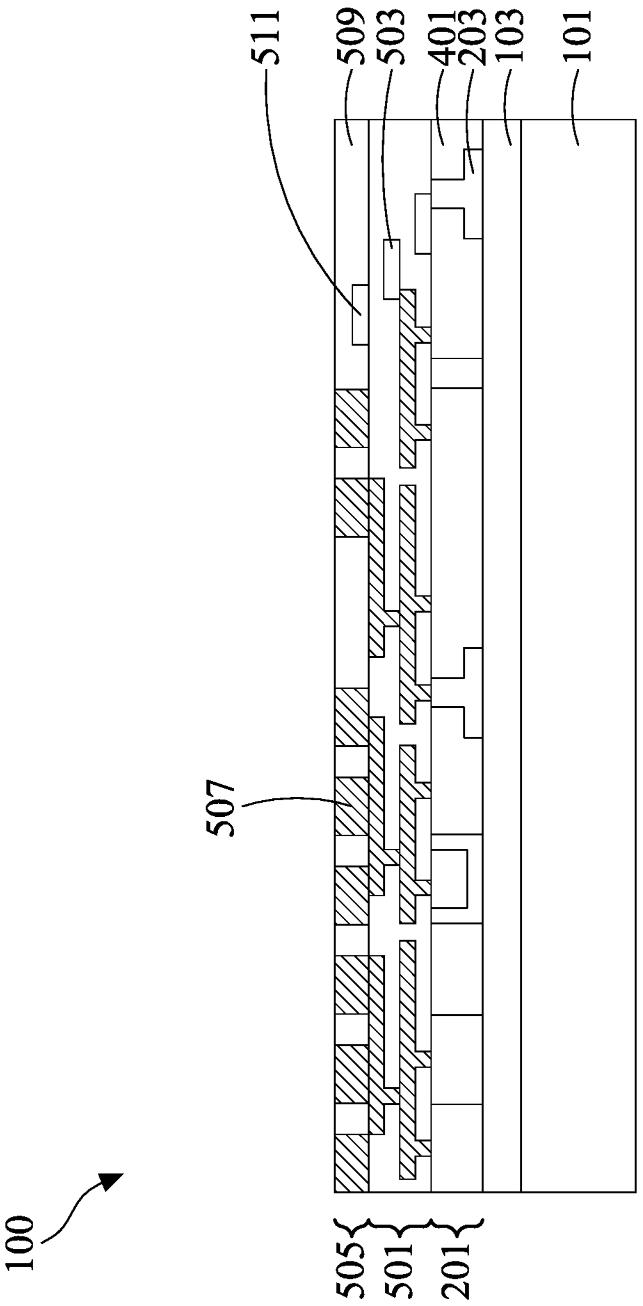

FIG. 5 illustrates that, once the first optical components 203 of the first active layer 201 have been manufactured and the second insulator layer 401 has been formed, first metallization layers 501 are formed in order to electrically connect the first active layer 201 of first optical components 203 to control circuitry, to each other, and to subsequently attached devices (not illustrated in FIG. 5 but illustrated and described further below with respect to FIG. 6). In an embodiment the first metallization layers 501 are formed of alternating layers of dielectric and conductive material and may be formed through any suitable processes (such as deposition, damascene, dual damascene, etc.). In particular embodiments there may be multiple layers of metallization used to interconnect the various first optical components 203, but the precise number of first metallization layers 501 is dependent upon the design of the optical interposer 100.

Additionally, during the manufacture of the first metallization layers 501, one or more second optical components 503 may be formed as part of the first metallization layers 501. In some embodiments the second optical components 503 of the first metallization layers 501 may include such components as couplers (e.g., edge couplers, grating couplers, etc.) for connection to outside signals, optical waveguides (e.g., ridge waveguides, rib waveguides, buried channel waveguides, diffused waveguides, etc.), optical modulators (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable optical components may be used for the one or more second optical components 503.

In an embodiment the one or more second optical components 503 may be formed by initially depositing a material for the one or more second optical components 503. In an embodiment the material for the one or more second optical components 503 may be a dielectric material such as silicon nitride, silicon oxide, combinations of these, or the like, or a semiconductor material such as silicon, deposited using a deposition method such as chemical vapor deposition, atomic layer deposition, physical vapor deposition, combinations of these, or the like. However, any suitable material and any suitable method of deposition may be utilized.

Once the material for the one or more second optical components 503 has been deposited or otherwise formed, the material may be patterned into the desired shapes for the one or more second optical components 503. In an embodiment the material of the one or more second optical components 503 may be patterned using, e.g., one or more photolithographic masking and etching processes. However, any suitable method of patterning the material for the one or more second optical components 503 may be utilized.

For some of the one or more second optical components 503, such as waveguides or edge couplers, the patterning process may be all or at least most manufacturing that is used to form these components. Additionally, for those components that utilize further manufacturing processes, such as Mach-Zehnder silicon-photonic switches that utilize resistive heating elements, additional processing may be performed either before or after the patterning of the material for the one or more second optical components 503. For example, implantation processes, additional deposition and patterning processes for different materials, combinations of all of these processes, or the like, can be utilized to help further the manufacturing of the various desired one or more second optical components 503. All such manufacturing processes and all suitable one or more second optical components 503 may be manufactured, and all such combinations are fully intended to be included within the scope of the embodiments.

Once the one or more second optical components 503 of the first metallization layers 501 have been manufactured, a first bonding layer 505 is formed over the first metallization layers 501. In an embodiment, the first bonding layer 505 may be used for a dielectric-to-dielectric and metal-to-metal bond. In accordance with some embodiments, the first bonding layer 505 is formed of a first dielectric material 509 such as silicon oxide, silicon nitride, or the like. The first dielectric material 509 may be deposited using any suitable method, such as CVD, high-density plasma chemical vapor deposition (HDPCVD), PVD, atomic layer deposition (ALD), or the like. However, any suitable materials and deposition processes may be utilized.

Once the first dielectric material 509 has been formed, first openings in the first dielectric material 509 are formed to expose conductive portions of the underlying layers in preparation to form first bond pads 507 within the first bonding layer 505. Once the first openings have been formed within the first dielectric material 509, the first openings may be filled with a seed layer and a plate metal to form the first bond pads 507 within the first dielectric material 509. The seed layer may be blanket deposited over top surfaces of the first dielectric material 509 and the exposed conductive portions of the underlying layers and sidewalls of the first openings and the second openings. The seed layer may comprise a copper layer. The seed layer may be deposited using processes such as sputtering, evaporation, or plasma-enhanced chemical vapor deposition (PECVD), or the like, depending upon the desired materials. The plate metal may be deposited over the seed layer through a plating process such as electrical or electro-less plating. The plate metal may comprise copper, a copper alloy, or the like. The plate metal may be a fill material. A barrier layer (not separately illustrated) may be blanket deposited over top surfaces of the first dielectric material 509 and sidewalls of the first openings and the second openings before the seed layer. The barrier layer may comprise titanium, titanium nitride, tantalum, tantalum nitride, or the like.

Following the filling of the first openings, a planarization process, such as a CMP, is performed to remove excess portions of the seed layer and the plate metal, forming the first bond pads 507 within the first bonding layer 505. In some embodiments a bond pad via (not separately illustrated) may also be utilized to connect the first bond pads 507 with underlying conductive portions and, through the underlying conductive portions, connect the first bond pads 507 with the first metallization layers 501.

Additionally, the first bonding layer 505 may also include one or more third optical components 511 incorporated within the first bonding layer 505. In such an embodiment, prior to the deposition of the first dielectric material 509, the one or more third optical components 511 may be manufactured using similar methods and similar materials as the one or more second optical components 503 (described above), such as by being waveguides and other structures formed at least in part through a deposition and patterning process. However, any suitable structures, materials and any suitable methods of manufacture may be utilized.

Figure 6:
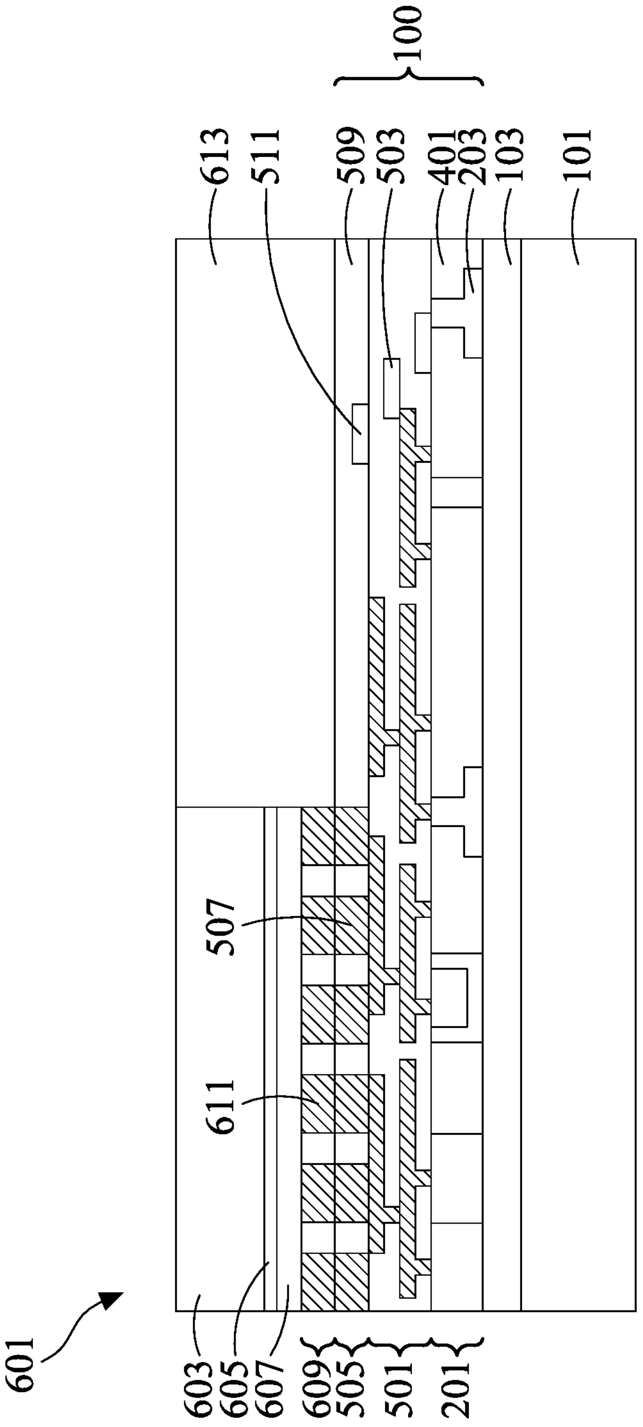

FIG. 6 illustrates a bonding of a first semiconductor device 601 to the first bonding layer 505 of the optical interposer 100. In some embodiments, the first semiconductor device 601 is an electronic integrated circuit (EIC—e.g., a device without optical devices) and may have a semiconductor substrate 603, a layer of active devices 605, an overlying interconnect structure 607, a second bonding layer 609, and associated third bond pads 611. In an embodiment the semiconductor substrate 603 may be similar to the first substrate 101 (e.g., a semiconductor material such as silicon or silicon germanium), the active devices 605 may be transistors, capacitors, resistors, and the like formed over the semiconductor substrate 603, the interconnect structure 607 may be similar to the first metallization layers 501 (without optical components), the second bonding layer 609 may be similar to the first bonding layer 505, and the third bond pads 611 may be similar to the first bond pads 507. However, any suitable devices may be utilized.

In an embodiment the first semiconductor device 601 may be configured to work with the optical interposer 100 for a desired functionality. In some embodiments the first semiconductor device 601 may be a high bandwidth memory (HBM) module, an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

In an embodiment the first semiconductor device 601 and the first bonding layer 505 may be bonded using a dielectric-to-dielectric and metal-to-metal bonding process. In a particular embodiment which utilizes a dielectric-to-dielectric and metal-to-metal bonding process, the process may be initiated by activating the surfaces of the second bonding layer 609 and the surfaces of the first bonding layer 505. Activating the top surfaces of the first bonding layer 505 and the second bonding layer 609 may comprise a dry treatment, a wet treatment, a plasma treatment, exposure to an inert gas plasma, exposure to $H_2$, exposure to $N_2$, exposure to $O_2$, combinations thereof, or the like, as examples. In embodiments where a wet treatment is used, an RCA cleaning may be used, for example. In another embodiment, the activation process may comprise other types of treatments. The activation process assists in the bonding of the first bonding layer 505 and the second bonding layer 609.

After the activation process the optical interposer 100 and the first semiconductor device 601 may be cleaned using, e.g., a chemical rinse, and then the first semiconductor device 601 is aligned and placed into physical contact with the optical interposer 100. The optical interposer 100 and the first semiconductor device 601 are then subjected to thermal treatment and contact pressure to bond the optical interposer 100 and the first semiconductor device 601. For example, the optical interposer 100 and the first semiconductor device 601 may be subjected to a pressure of about 200 kPa or less, and a temperature between about 25° C. and about 250° C. to fuse the optical interposer 100 and the first semiconductor device 601. The optical interposer 100 and the first semiconductor device 601 may then be subjected to a temperature at or above the eutectic point for material of the first bond pads 507 and the third bond pads 611, e.g., between about 150° C. and about 650° C., to fuse the metal. In this manner, the optical interposer 100 and the first semiconductor device 601 forms a dielectric-to-dielectric and metal-to-metal bonded device. In some embodiments, the bonded dies are subsequently baked, annealed, pressed, or otherwise treated to strengthen or finalize the bond.

Additionally, while specific processes have been described to initiate and strengthen the bonds, these descriptions are intended to be illustrative and are not intended to be limiting upon the embodiments. Rather, any suitable combination of baking, annealing, pressing, or combination of processes may be utilized. All such processes are fully intended to be included within the scope of the embodiments.

FIG. 6 additionally illustrates that, once the first semiconductor device 601 has been bonded, a first gap-fill material 613 is deposited in order to fill the space around the first semiconductor device 601 and provide additional support. In an embodiment the first gap-fill material 613 may be a material such as silicon oxide, silicon nitride, silicon oxynitride, combinations of these, or the like, deposited to fill and overfill the spaces around the first semiconductor device 601. However, any suitable material and method of deposition may be utilized.

Once the first gap-fill material 613 has been deposited, the first gap-fill material 613 may be planarized in order to expose the first semiconductor device 601. In an embodiment the planarization process may be a chemical mechanical planarization process, a grinding process, or the like. However, any suitable planarization process may be utilized.

Figure 7:
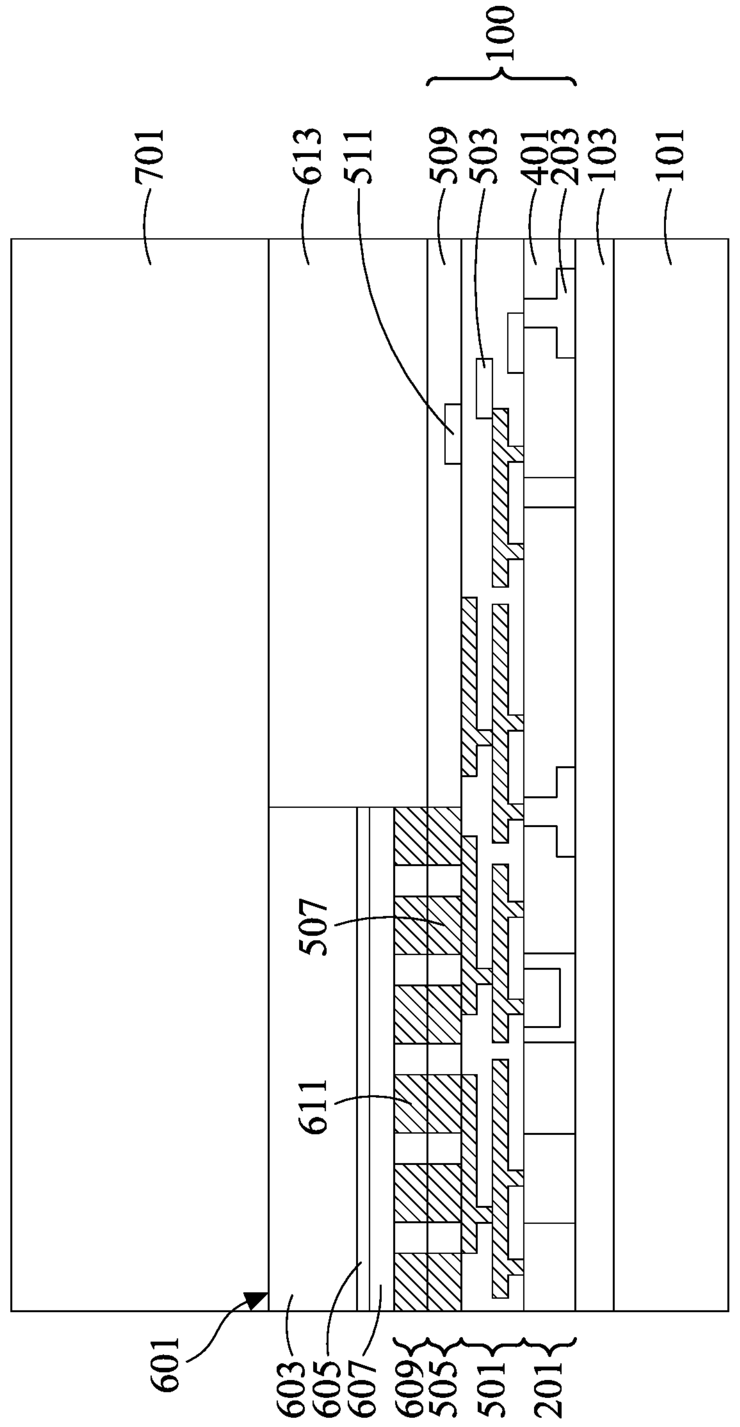

FIG. 7 illustrates an attachment of a first support substrate 701 to the first semiconductor device 601 and the first gap-fill material 613. In an embodiment the first support substrate 701 may be a support material that is transparent to the wavelength of light that is desired to be used, such as silicon, and may be attached using, e.g., an adhesive (not separately illustrated in FIG. 7). However, in other embodiments the first support substrate 701 may be bonded to the first semiconductor device 601 and the first gap-fill material 613 using, e.g., a bonding process. Any suitable method of attaching the first support substrate 701 may be used.

Figure 8:
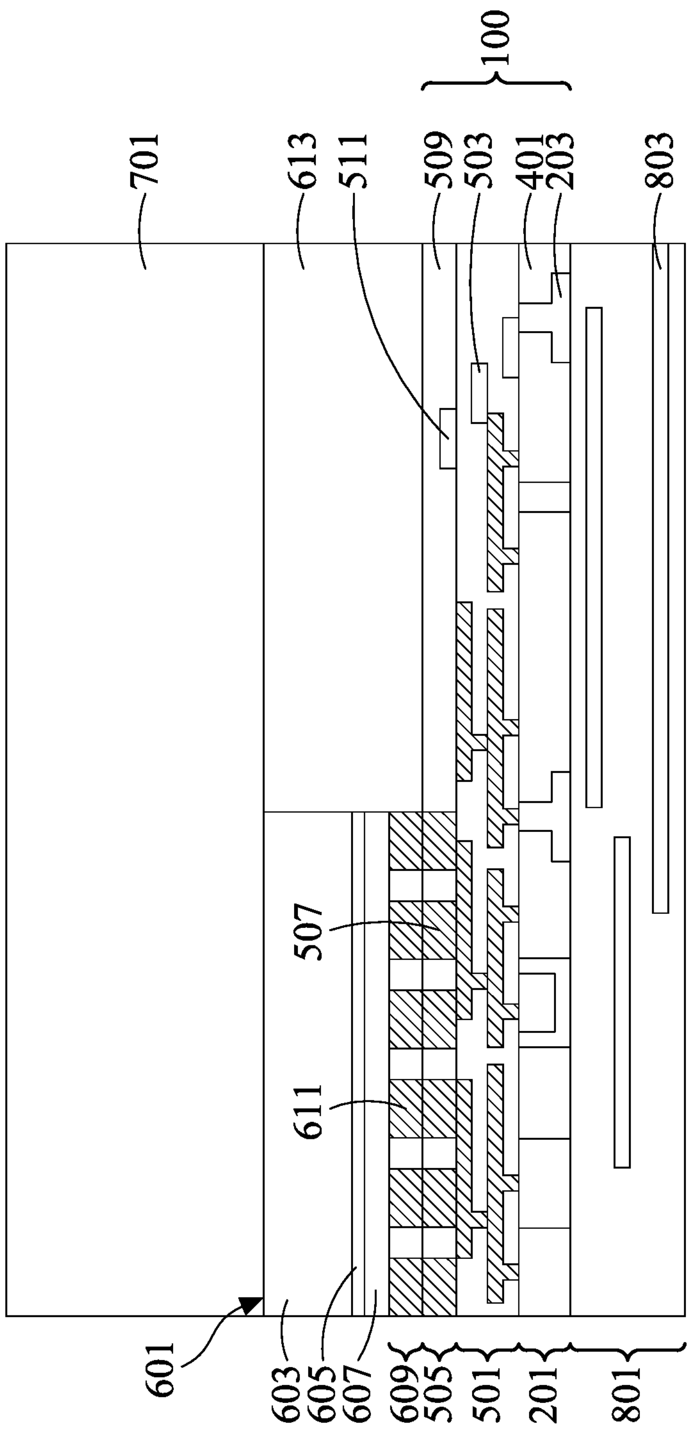

FIG. 8 illustrates a removal of the first substrate 101 and, optionally, the first insulator layer 103, thereby exposing the first active layer 201 of first optical components 203. In an embodiment the first substrate 101 and the first insulator layer 103 may be removed using a planarization process, such as a chemical mechanical polishing process, a grinding process, one or more etching processes, combinations of these, or the like. However, any suitable method may be used in order to remove the first substrate 101 and/or the first insulator layer 103.

Once the first substrate 101 and the first insulator layer 103 have been removed, a second active layer 801 of fourth optical components 803 may be formed on a back side of the first active layer 201. In an embodiment the second active layer 801 of fourth optical components 803 may be formed using similar materials and similar processes as the second optical components 503 of the first metallization layers 501 (described above with respect to FIG. 5). For example, the second active layer 801 of fourth optical components 803 may be formed of alternating layers of a cladding material such as silicon oxide and core material such as silicon nitride formed using deposition and patterning processes in order to form optical components such as waveguides and the like.

Figure 9:
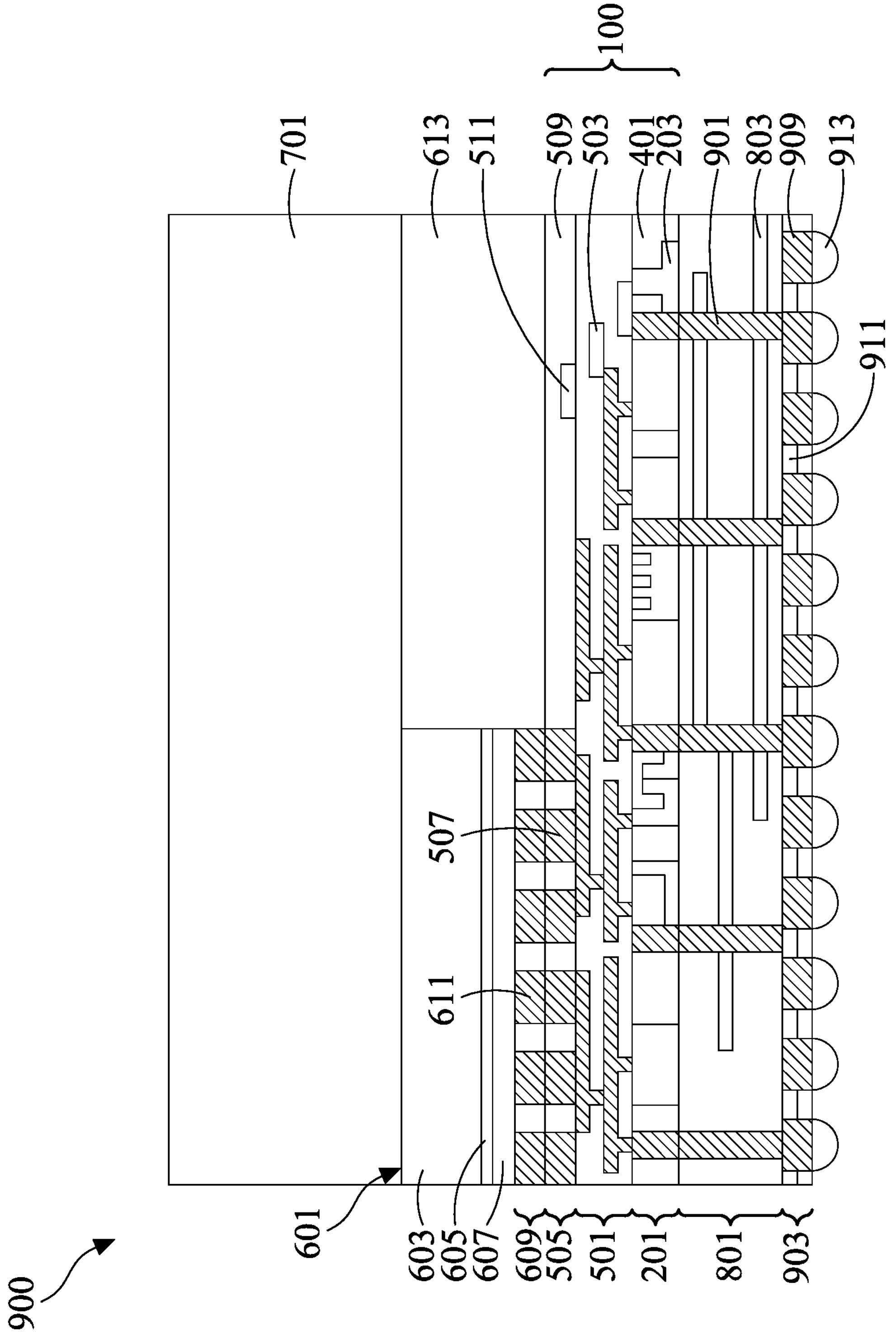

FIG. 9 illustrates formation of first through device vias (TDVs) 901 and formation of a third bonding layer 903 to form a first optical package 900. In an embodiment the first through device vias 901 extend through the second active layer 801 and the first active layer 201 so as to provide a quick passage of power, data, and ground through the optical interposer 100. In an embodiment the first through device vias 901 may be formed by initially forming through device via openings into the optical interposer 100. The through device via openings may be formed by applying and developing a suitable photoresist (not shown), and removing portions of the second active layer 801 and the optical interposer 100 that are exposed.

Once the through device via openings have been formed within the optical interposer 100, the through device via openings may be lined with a liner. The liner may be, e.g., an oxide formed from tetraethylorthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may also be used.

Once the liner has been formed along the sidewalls and bottom of the through device via openings, a barrier layer (also not independently illustrated) may be formed and the remainder of the through device via openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer (not shown), filling and overfilling the through device via openings. Once the through device via openings have been filled, excess liner, barrier layer, seed layer, and first conductive material outside of the through device via openings may be removed through a planarization process such as chemical mechanical polishing (CMP), although any suitable removal process may be used.

Optionally, in some embodiments once the first through device vias 901 have been formed, second metallization layers (not separately illustrated in FIG. 9) may be formed in electrical connection with the first through device vias 901. In an embodiment the second metallization layers may be formed as described above with respect to the first metallization layers 501, such as being alternating layers of dielectric and conductive materials using damascene processes, dual damascene process, or the like. In other embodiments, the second metallization layers may be formed using a plating process to form and shape conductive material, and then cover the conductive material with a dielectric material. However, any suitable structures and methods of manufacture may be utilized.

The third bonding layer 903 is formed in order to provide electrical connections between the optical interposer 100 and subsequently attached devices. In an embodiment the third bonding layer 903 may be similar to the first bonding layer 505, such as having third bond pads 909 (similar to the first bond pads 507) and even fifth optical components 911 (similar to the third optical components 511). However, any suitable devices may be utilized.

FIG. 9 additionally illustrates a placement of first external connectors 913 which may be formed to provide conductive regions for contact between the third bond pads 909 to other external devices. The first external connectors 913 may be conductive bumps (e.g., C4 bumps, ball grid arrays, microbumps, etc.) or conductive pillars utilizing materials such as solder and copper. In an embodiment in which the first external connectors 913 are contact bumps, the first external connectors 913 may comprise a material such as tin, or other suitable materials, such as silver, lead-free tin, or copper. In an embodiment in which the first external connectors 913 are tin solder bumps, the first external connectors 913 may be formed by initially forming a layer of tin through such commonly used methods such as evaporation, electroplating, printing, solder transfer, ball placement, etc. Once a layer of tin has been formed on the structure, a reflow may be performed in order to shape the material into the desired bump shape.

Figure 10:
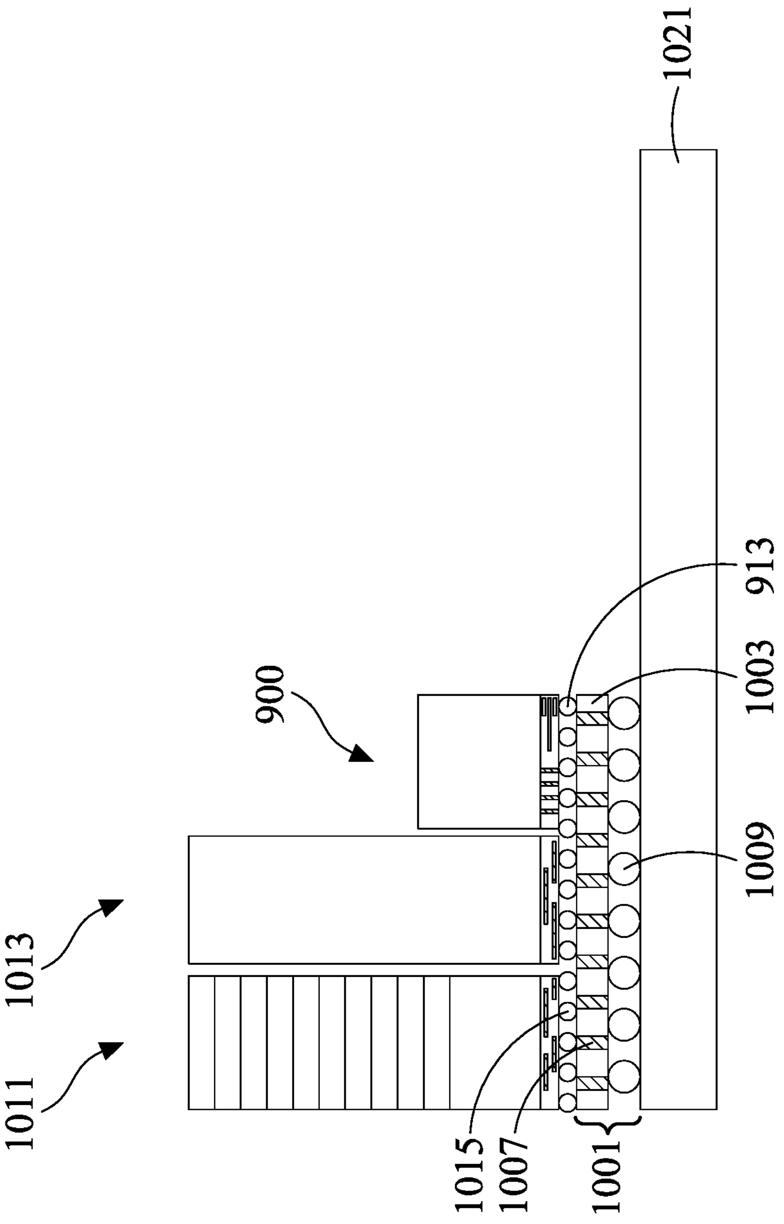
FIG. 10 illustrates a bonding of the first optical package, in accordance with some embodiments.

FIG. 10 illustrates that, once the first optical package 900 has been formed, the first optical package 900 may be attached to an interposer substrate 1001 that is used to couple the first optical package 900 with other devices to form, for example, a chip-on-wafer-on-substrate (CoWoS®) device. In an embodiment the interposer substrate 1001 comprises a semiconductor substrate 1003, optional third metallization layers (not separately illustrated in FIG. 10), third through device vias (TDVs) 1007, and second external connectors 1009. The semiconductor substrate 1003 may comprise bulk silicon, doped or undoped, or an active layer of a silicon-on-insulator (SOI) substrate. Generally, an SOI substrate comprises a layer of a semiconductor material such as silicon, germanium, silicon germanium, SOI, silicon germanium on insulator (SGOI), or combinations thereof. Other substrates that may be used include multi-layered substrates, gradient substrates, or hybrid orientation substrates.

Optionally, first active devices (not separately illustrated) may be added to the semiconductor substrate 1003. The first active devices comprise a wide variety of active devices and passive devices such as capacitors, resistors, inductors and the like that may be used to generate the desired structural and functional requirements of the design for the semiconductor substrate 1003. The first active devices may be formed using any suitable methods either within or else on the semiconductor substrate 1003.

The third metallization layers are formed over the semiconductor substrate 1003 and the first active devices and are designed to connect the various devices to form functional circuitry. In an embodiment the third metallization layers are formed of alternating layers of dielectric (e.g., low-k dielectric materials, extremely low-k dielectric material, ultra low-k dielectric materials, combinations of these, or the like) and conductive material and may be formed through any suitable process (such as deposition, damascene, dual damascene, etc.). However, any suitable materials and processes may be utilized.

Additionally, if desired, the third metallization layers may further comprise interposer optical components that can interact with the fifth optical components 911 of the first optical package 900. In an embodiment the interposer optical components can be formed using similar methods and materials as the third optical components 511 described above with respect to FIG. 5. However, any suitable methods and materials may be utilized.

Additionally, at any desired point in the manufacturing process, the third TDVs 1007 may be formed within the semiconductor substrate 1003 and, if desired, one or more layers of the third metallization layers, in order to provide electrical connectivity from a front side of the semiconductor substrate 1003 to a back side of the semiconductor substrate 1003. In an embodiment the third TDVs 1007 may be formed by initially forming through device via (TDV) openings into the semiconductor substrate 1003 and, if desired, any of the overlying third metallization layers (e.g., after the desired third metallization layer has been formed but prior to formation of the next overlying third metallization layer). The TDV openings may be formed by applying and developing a suitable photoresist, and removing portions of the underlying materials that are exposed to a desired depth. The TDV openings may be formed so as to extend into the semiconductor substrate 1003 to a depth greater than the eventual desired height of the semiconductor substrate 1003.

Once the TDV openings have been formed within the semiconductor substrate 1003 and/or any third metallization layers, the TDV openings may be lined with a liner. The liner may be, e.g., an oxide formed from tetraethylorthosilicate (TEOS) or silicon nitride, although any suitable dielectric material may be used. The liner may be formed using a plasma enhanced chemical vapor deposition (PECVD) process, although other suitable processes, such as physical vapor deposition or a thermal process, may be used.

Once the liner has been formed along the sidewalls and bottom of the TDV openings, a barrier layer may be formed and the remainder of the TDV openings may be filled with first conductive material. The first conductive material may comprise copper, although other suitable materials such as aluminum, alloys, doped polysilicon, combinations thereof, and the like, may be utilized. The first conductive material may be formed by electroplating copper onto a seed layer, filling and overfilling the TDV openings. Once the TDV openings have been filled, excess liner, barrier layer, seed layer, and first conductive material outside of the TDV openings may be removed through a planarization process such as chemical mechanical polishing (CMP), although any suitable removal process may be used.

Once the TDV openings have been filled, the semiconductor substrate 1003 may be thinned until the third TDVs 1007 have been exposed. In an embodiment the semiconductor substrate 1003 may be thinned using, e.g., a chemical mechanical polishing process, a grinding process, or the like. Further, once exposed, the semiconductor substrate 1003 may be recessed using, e.g., one or more etching processes, such as a wet etch process in order to recess the semiconductor substrate 1003 so that the third TDVs 1007 extend out of the semiconductor substrate 1003.

In an embodiment the second external connectors 1009 may be placed on the semiconductor substrate 1003 in electrical connection with the third TDVs 1007 and may be, e.g., a ball grid array (BGA) which comprises a eutectic material such as solder, although any suitable materials may be used. Optionally, an underbump metallization or additional metallization layers (not separately illustrated in FIG. 10) may be utilized between the semiconductor substrate 1003 and the second external connectors 1009. In an embodiment in which the second external connectors 1009 are solder bumps, the second external connectors 1009 may be formed using a ball drop method, such as a direct ball drop process. In another embodiment, the solder bumps may be formed by initially forming a layer of tin through any suitable method such as evaporation, electroplating, printing, solder transfer, and then performing a reflow in order to shape the material into the desired bump shape. Once the second external connectors 1009 have been formed, a test may be performed to ensure that the structure is suitable for further processing.

Once the interposer substrate 1001 has been formed, the first optical package 900 may be attached to the interposer substrate 1001. In an embodiment the first optical package 900 may be attached to the interposer substrate 1001 by aligning the first external connectors 913 with conductive portions of the interposer substrate 1001. Once aligned and in physical contact, the first external connectors 913 are reflowed by raising the temperature of the first external connectors 913 past a eutectic point of the first external connectors 913, thereby shifting the material of the first external connectors 913 to a liquid phase. Once reflowed, the temperature is reduced in order to shift the material of the first external connectors 913 back to a solid phase, thereby bonding the first optical package 900 to the interposer substrate 1001.

FIG. 10 additionally illustrates a bonding of a second semiconductor device 1011 and a third semiconductor device 1013 onto the semiconductor substrate 1003. In some embodiments, the second semiconductor device 1011 is an electronic integrated circuit (EIC) such as a stacked device that includes multiple, interconnected semiconductor substrates. For example, the second semiconductor device 1011 may be a memory device such as a high bandwidth memory (HBM) module, a hybrid memory cube (HMC) module, or the like that includes multiple stacked memory dies. In such embodiments, the second semiconductor device 1011 includes multiple semiconductor substrates interconnected by through device vias (TDVs). Each of the semiconductor substrates may (or may not) have a layer of active devices and an overlying interconnect structure, a bond layer, and associated bond pads in order to interconnect the multiple devices within the second semiconductor device 1011.

Of course, while the second semiconductor device 1011 is a HBM module in one embodiment, the embodiments are not restricted to the second semiconductor device 1011 being an HBM module. Rather, the second semiconductor device 1011 may be any suitable semiconductor device, such as a processor die or other type of functional die. In particular embodiments the second semiconductor device 1011 may be an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

The third semiconductor device 1013 may be another EIC that is intended to work with both the first optical package 900 and the second semiconductor device 1011. In some embodiments the third semiconductor device 1013 may have a different functionality from the second semiconductor device 1011, such as by being an xPU, a GPU, an ASIC device, or may have a same functionality as the second semiconductor device 1011, such as by being another high bandwidth memory device.

In an embodiment both the second semiconductor device 1011 and the third semiconductor device 1013 may be bonded to the interposer substrate 1001 using, e.g., third external connections 1015. The third external connections 1015 may be conductive bumps (e.g., ball grid arrays, microbumps, etc.) or conductive pillars utilizing materials such as solder and copper. In an embodiment in which the third external connections 1015 are contact bumps, the third external connections 1015 may comprise a material such as tin, or other suitable materials, such as silver, lead-free tin, or copper. In an embodiment in which the third external connections 1015 are tin solder bumps, the third external connections 1015 may be formed by initially forming a layer of tin through such commonly used methods such as evaporation, electroplating, printing, solder transfer, ball placement, etc. Once a layer of tin has been formed on the structure, a reflow may be performed in order to shape the material into the desired bump shape.

Additionally, once the third external connections 1015 have been placed, the second semiconductor device 1011 and the third semiconductor device 1013 are aligned with the interposer substrate 1001. Once aligned and in physical contact, the third external connections 1015 are reflowed by raising the temperature of the third external connections 1015 past a eutectic point of the third external connections 1015, thereby shifting the material of the third external connections 1015 to a liquid phase. Once reflowed, the temperature is reduced in order to shift the material of the third external connections 1015 back to a solid phase, thereby bonding the second semiconductor device 1011 and the third semiconductor device 1013 to the interposer substrate 1001.

Optionally, an underfill material (not separately illustrated) may be placed. The underfill material may reduce stress and protect the joints resulting from the reflowing of the third external connections 1015 and the first external connectors 913. The underfill material may be formed by a capillary flow process after the first optical package 900, the second semiconductor device 1011 and the third semiconductor device 1013 are attached.

Once the second semiconductor device 1011, the third semiconductor device 1013 and the first optical package 900 have been bonded to the interposer substrate 1001, the interposer substrate 1001 may be bonded to a second substrate 1021 with, e.g., the second external connectors 1009. In an embodiment the second substrate 1021 may be a package substrate, which may be a printed circuit board (PCB) or the like. The second substrate 1021 may include one or more dielectric layers and electrically conductive features, such as conductive lines and vias. In some embodiments, the second substrate 1021 may include through-vias, active devices, passive devices, and the like. The second substrate 1021 may further include conductive pads formed at the upper and lower surfaces of the second substrate 1021.

The second external connectors 1009 may be aligned with corresponding conductive connections on the second substrate 1021. Once aligned the second external connectors 1009 may then be reflowed in order to bond the second substrate 1021 to the interposer substrate 1001. However, any suitable bonding process may be used to connect the interposer substrate 1001 to the second substrate 1021.

Additionally, the second substrate 1021 may be prepared for further connections by placing fourth external connections (not separately illustrated) on an opposite side of the second substrate 1021 from the first optical package 900. In an embodiment the fourth external connections may be formed using similar processes and materials as the second external connectors 1009. However, any suitable materials and processes may be utilized.

Figure 11A:
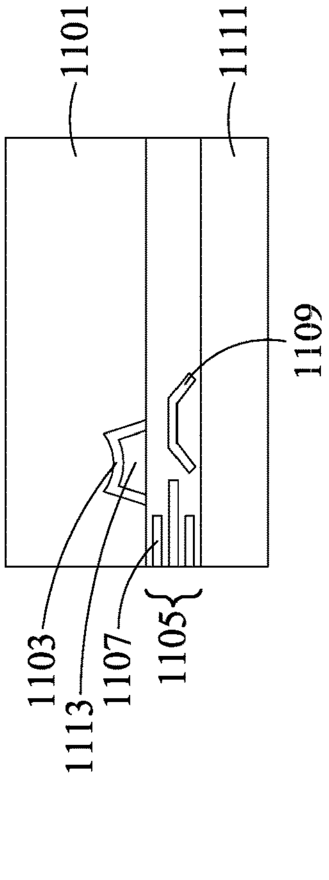
FIGS. 11A-11B illustrate formation of a first tier active layer, in accordance with some embodiments.

FIGS. 11A-16B illustrate formation of a multi-tier connection unit 1600 (e.g., a fan-in fiber array unit) for use with the first optical package 900. Looking first at FIG. 11A, FIG. 11A illustrates a first tier substrate 1101, a first lens 1103 formed within the first tier substrate 1101, a first tier active layer 1105 with sixth optical components 1107, and a first mirror 1109 bonded to a first carrier substrate 1111. In an embodiment the first tier substrate 1101 may be similar to the first substrate 101 described above with respect to FIG. 1, such as by being a silicon substrate. However, any suitable material may be utilized.

The first lens 1103 is formed within the first tier substrate 1101. In an embodiment the first lens 1103 may be formed by shaping the material of the support substrate (e.g., silicon) using masking and etching processes. However, any suitable process may be utilized.

Additionally, if desired, a first anti-reflective coating (ARC) 1113 may be formed on the first lens 1103. In an embodiment the first ARC 1113 may be one or more layers of materials which help to prevent undesired reflections as light is focused through the first lens 1103. In a particular embodiment the one or more layers of materials may be materials such as silicon oxide, silicon nitride, combinations of these, or the like, formed using processes such as chemical vapor deposition, atomic layer deposition, physical vapor deposition, oxidation, nitridation, combinations of these, or the like.

In a particular embodiment the first ARC 1113 may be formed using a first layer of silicon oxide and a first layer of silicon nitride formed over the first layer of silicon oxide. A second layer of silicon oxide and a second layer of silicon nitride are deposited over the first layer of silicon oxide and the first layer of silicon nitride, forming an alternating stack of silicon oxide and silicon nitride. Once all of the desired layers have been deposited, the layers may be patterned using, e.g., a photolithographic masking and etching process. However, any suitable combinations of materials and processes may be utilized.

Additionally, if the recess formed by the first lens 1103 is not otherwise filled, a fill material may be deposited in order to fill the recess formed by the first lens 1103. In an embodiment the fill material may be a cladding material such as silicon oxide deposited using a method such as chemical vapor deposition, physical vapor deposition, atomic layer deposition, combinations of these, or the like. Once the recess has been filled, the fill material may be planarized using a process such as chemical mechanical polishing in order to remove portions of the fill material outside of the recess.

Once the first lens 1103 has been formed, a first tier active layer 1105 with sixth optical components 1107 is formed over the first tier substrate 1101. In an embodiment the first tier active layer 1105 with sixth optical components 1107 may be formed using similar materials and similar processes as the second active layer 801 of the fourth optical components 803 described above with respect to FIG. 8. However, any suitable materials and processes may be utilized.

In a particular embodiment the sixth optical components 1107 comprise at least one integrated multiple coupler (IMC) (e.g., an edge coupler), such as a multiple waveguide edge coupler that is situated to receive optical signals (described further below with respect to FIG. 19) and interact with waveguides within the first optical package 900. However, any suitable optical components may be formed.

Once the first tier active layer 1105 with sixth optical components 1107 has been formed, the first mirror 1109 may be formed to extend into the first tier active layer 1105 and have a first orientation. In an embodiment the first mirror 1109 may be formed by initially patterning the first tier active layer 1105 to form a recess. In an embodiment the recess may be formed using one or more photolithographic masking and etching processes, such as one or more wet etching processes or dry etching processes. However, any suitable process may be utilized.

Once the recess has been formed, the first mirror 1109 may be formed along sidewalls of the recess. In an embodiment the first mirror 1109 may be a single layer of a reflective material such as aluminum copper, copper, gold, aluminum, titanium nitride, combinations of these, or the like, or else may be a multi-layer structure such as a Braggs reflector comprising alternating layers of different materials, such as alternating layers of silicon dioxide and amorphous silicon. The individual materials of the first mirror 1109 may be deposited using any suitable methods, such as chemical vapor deposition, physical vapor deposition, plating, combinations of these, or the like, and the individual layers may be then be further patterned using, e.g., a photolithographic masking and etching process (for example, to remove horizontal portions of the deposited materials). However, any suitable materials and methods may be utilized in order to form the first mirror 1109 along the sidewalls of the recess.

Additionally, if the formation of the first mirror 1109 does not fully fill the recess, the recess may be filled and planarized. In an embodiment the recess may be filled and/or overfilled with a material similar to the cladding material of the first tier active layer 1105 deposited using a method such as chemical vapor deposition, followed by a planarization process such as a chemical mechanical polishing process. However, any suitable material and any suitable process may be utilized.

Once the first mirror 1109 has been formed, the first tier active layer 1105 may be bonded to a first carrier substrate 1111. In an embodiment the first carrier substrate 1111 may comprise a material such as glass, silicon, silicon germanium, combinations of these, or the like, and the first carrier substrate 1111 may be bonded to the first tier active layer 1105 using, for example, a dielectric-to-dielectric bonding process. However, any suitable materials and any suitable bonding process may be utilized.

Figure 11B:
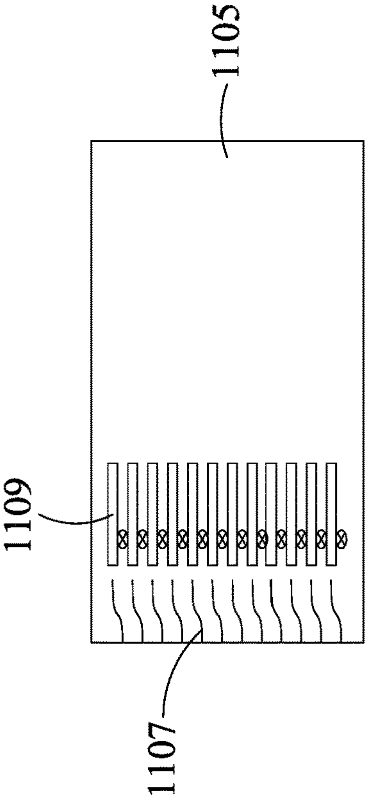

FIG. 11B illustrates a top down view of the first tier active layer 1105 with the sixth optical components 1107 and the first mirror 1109. In an embodiment, each of the sixth optical components 1107 (e.g., waveguides) within the first tier active layer 1105 are aligned so that optical signals transmitted and received will be reflected by the first mirror 1109. However, because signals from overlying structures (e.g., a second mirror 1207—discussed further below with respect to FIGS. 12A-12B) will pass through the first tier active layer 1105, the first mirror 1109 may be shaped and formed in order to allow for the passage of optical signals through the first mirror 1109. As such, the first mirror 1109 may be formed not as a single unit, but with a plurality of sections, wherein each section is aligned to reflect an optical signal from one or more, but not all, of the sixth optical components 1107 while still allowing optical signals reflected from, e.g., the second mirror 1207 to pass through the first mirror 1109.

Figure 12A:
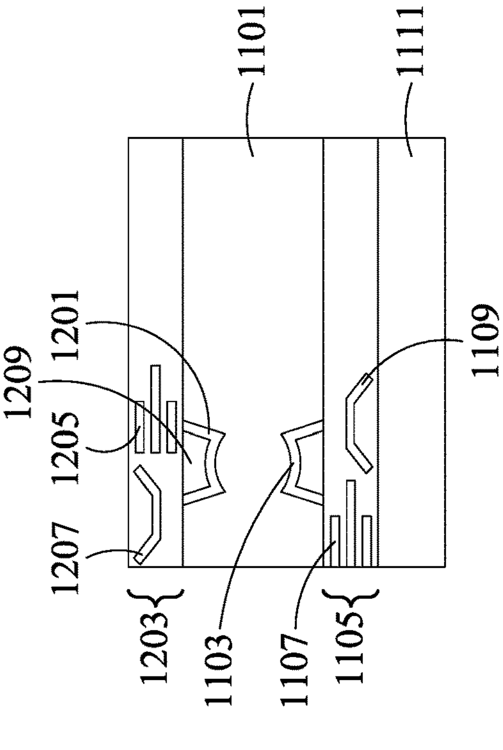
FIGS. 12A-12B illustrate formation of a second tier active layer, in accordance with some embodiments.

FIG. 12A illustrates formation of a second lens 1201 on an opposite side of the first tier substrate 1101 from the first lens 1103. In an embodiment the second lens 1201 may be formed using similar processes as the first lens 1103 described above with respect to FIG. 11A and, if desired, a second ARC 1209 may be formed using similar processes as the first ARC 1113. However, any suitable processes may be utilized.

A second tier active layer 1203 with seventh optical components 1205 may be formed over the second lens 1201. In an embodiment the second tier active layer 1203 and the seventh optical components 1205 may be formed using similar materials and methods as the first tier active layer 1105 with sixth optical components 1107 described above with respect to FIG. 11A.

FIG. 12A additionally illustrates a formation of a second mirror 1207 with a second orientation different from the first orientation. In an embodiment the second mirror 1207 may be formed using similar processes and materials as the first mirror 1109, described above with respect to FIG. 11A. However, any suitable process and materials may be utilized.

Figure 12B:
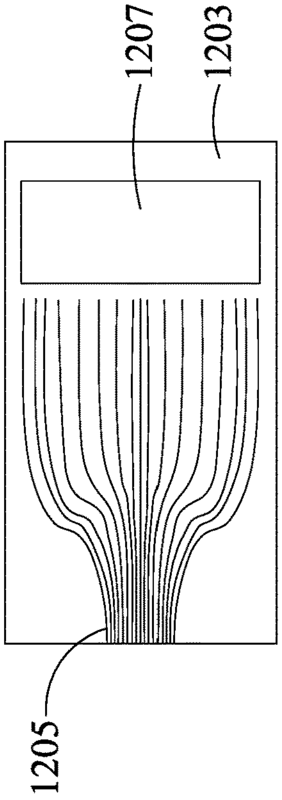

FIG. 12B illustrates a top down view of the second tier active layer 1203 with the seventh optical components 1205 and the second mirror 1207, with the seventh optical components 1205 being illustrated to have a fan-in design. In an embodiment, and as can be seen in FIG. 12B, the second mirror 1207 is designed to receive the reflections of optical signals from both the first mirror 1109 and a third mirror 1611 (not illustrated in FIG. 12B but illustrated and described further below with respect to FIGS. 16A-16B) and reflect the optical signals into the seventh optical components 1205. As such, the second mirror 1207 may be formed and shaped as a single unit (as illustrated in FIG. 12B), or else may be formed and shaped to have multiple, separate sections (similar to the first mirror 1109 illustrated above with respect to FIG. 11B). Any suitable shape may be utilized.

Figure 13:
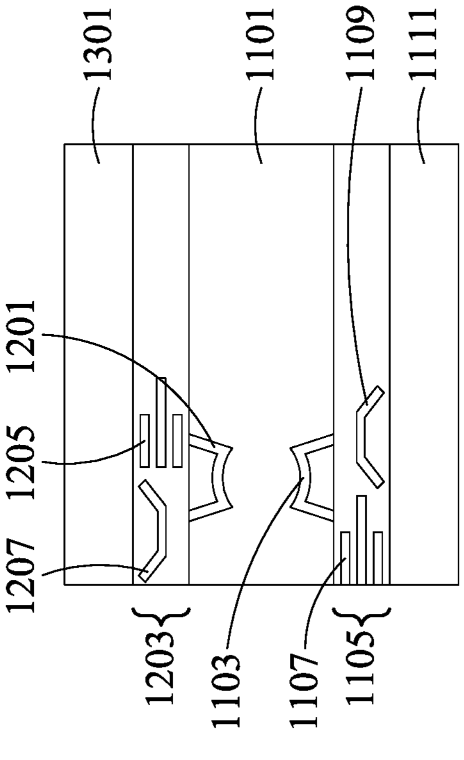
FIG. 13 illustrates a bonding of the first tier active layer to a substrate, in accordance with some embodiments.

FIG. 13 illustrates a bonding of the second tier active layer 1203 with a second tier substrate 1301. In an embodiment the second tier substrate 1301 may be similar to the first tier substrate 1101, such as by being a silicon substrate, and may be bonded using, for example, a dielectric-to-dielectric bonding process. However, any suitable material and any suitable bonding process may be utilized.

Additionally, if desired, at this point in the manufacturing process the second tier active layer 1203, after being bonded, may be thinned. In a particular embodiment the second tier active layer 1203 may be thinned using a planarization process, such as a chemical mechanical polishing process. However, any suitable planarization process, such as a grinding process or one or more etching processes, may be utilized.

Figure 14:
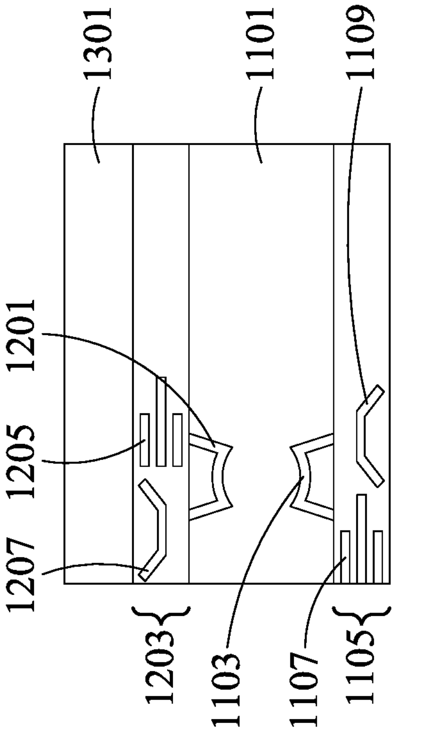
FIG. 14 illustrates an exposure of the first tier active layer, in accordance with some embodiments.

FIG. 14 illustrates that, once the second tier substrate 1301 has been bonded to the second tier active layer 1203, the first carrier substrate 1111 may be debonded and removed in order to expose the first tier active layer 1105. In an embodiment the second tier substrate 1301 may be removed using any suitable method, such as one or more planarization processes (e.g., a chemical mechanical polishing process) or one or more etching processes. However, any suitable debonding process may be utilized.

Figure 15:
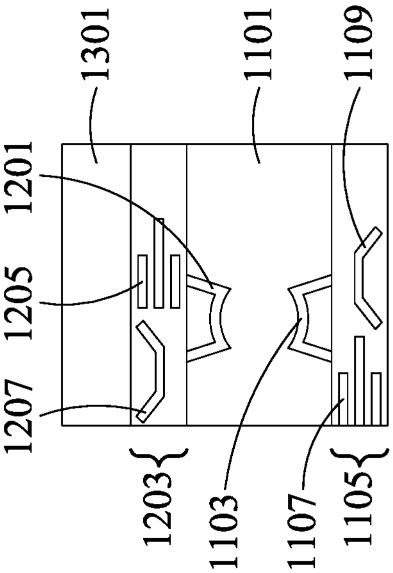
FIG. 15 illustrates a singulation process, in accordance with some embodiments.

FIG. 15 illustrates a singulation of the first tier substrate 1101 and the second tier substrate 1301. In an embodiment the singulation may be performed using a saw to physically cut through the structures. In other embodiments one or more masking and etching processes, or a combination of sawing and etching processes may be utilized to singulate the structures. Any suitable method or combination of methods may be utilized.

Figure 16B:
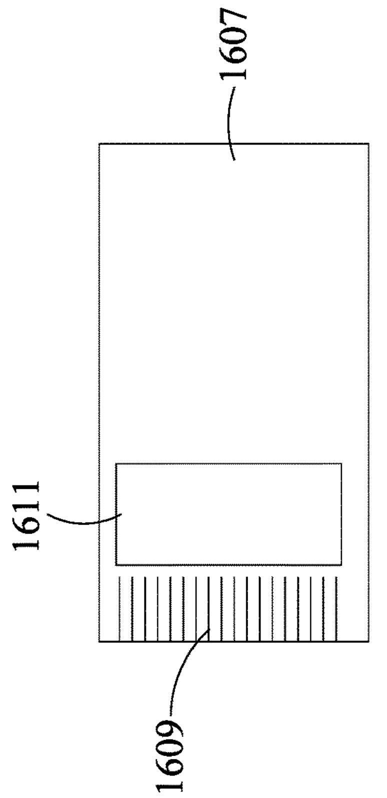
FIGS. 16A-16B illustrates formation of a third tier active layer, in accordance with some embodiments.
Figure 16A:
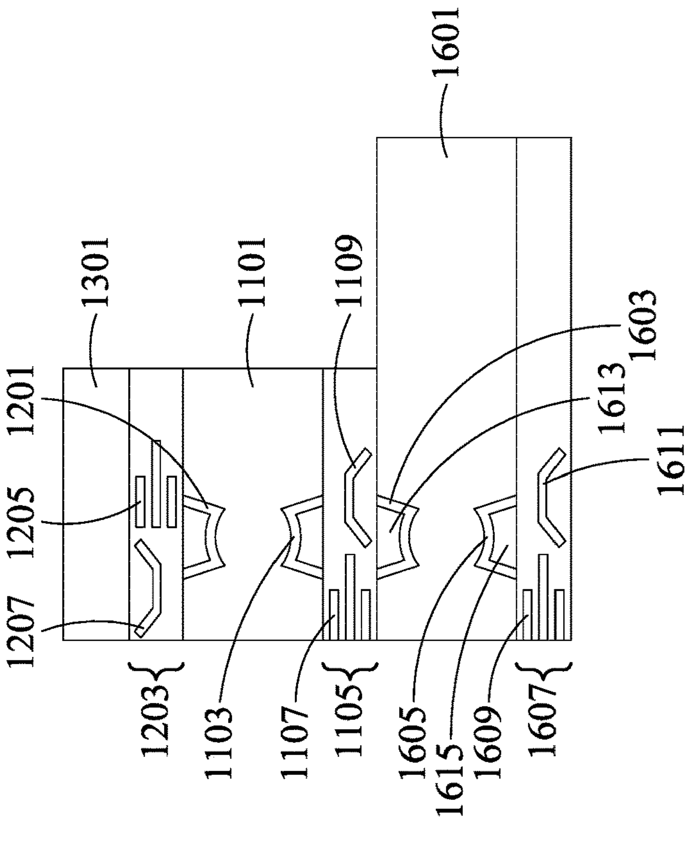

FIG. 16A illustrates a bonding of the first tier active layer 1105 to a third tier substrate 1601 with a third lens 1603 and a fourth lens 1605 located on opposite sides of the third tier substrate 1601. Looking first at the third tier substrate 1601, the third tier substrate 1601 may be similar to the first tier substrate 1101 described above with respect to FIG. 11A, such as being a silicon substrate. However, any suitable materials may be used.

The third lens 1603 and the fourth lens 1605 may be formed on opposite sides of the third tier substrate 1601. In an embodiment the third lens 1603 and the fourth lens 1605 may be formed using similar methods as the first lens 1103, such as using one or more photolithographic masking and etching process to shape the surfaces of the third tier substrate 1601 and, if desired, a third ARC 1613 and a fourth ARC 1615 may be formed using similar processes and materials as the first ARC 1113. However, any suitable methods may be utilized.

After the third lens 1603 and the fourth lens 1605 have been formed, a third tier active layer 1607 with eighth optical components 1609 may be formed. In an embodiment the third tier active layer 1607 with eighth optical components 1609 may be formed using similar processes and similar materials as the first tier active layer 1105 with sixth optical components 1107 (described above with respect to FIG. 11A). However, any suitable methods and materials may be utilized.

FIG. 16A additionally illustrates a formation of a third mirror 1611 with a third orientation that is the same as the first orientation within the third tier active layer 1607. In an embodiment the third mirror 1611 may be formed using similar processes and materials as the first mirror 1109, described above with respect to FIG. 11A. However, any suitable process and materials may be utilized.

Once the third mirror 1611 has been formed, the first tier active layer 1105 may be bonded to the third tier substrate 1601 to form a multi-tier connection unit 1600. In an embodiment the first tier active layer 1105 may be bonded to the third tier substrate 1601 using, e.g., a dielectric-to-dielectric bonding process. However, any suitable bonding process may be utilized.

FIG. 16B illustrates a top down view of the third tier active layer 1607 with the eighth optical components 1609 and the third mirror 1611. In an embodiment, and as can be seen in FIG. 16B, the third mirror 1611 is designed to receive optical signals from the eighth optical components 1609 and reflect the optical signals towards the fourth lens 1605. As such, the third mirror 1611 may be formed and shaped as a single unit, or else may be formed and shaped to have multiple, separate sections. Any suitable shape may be utilized.

Figure 17:
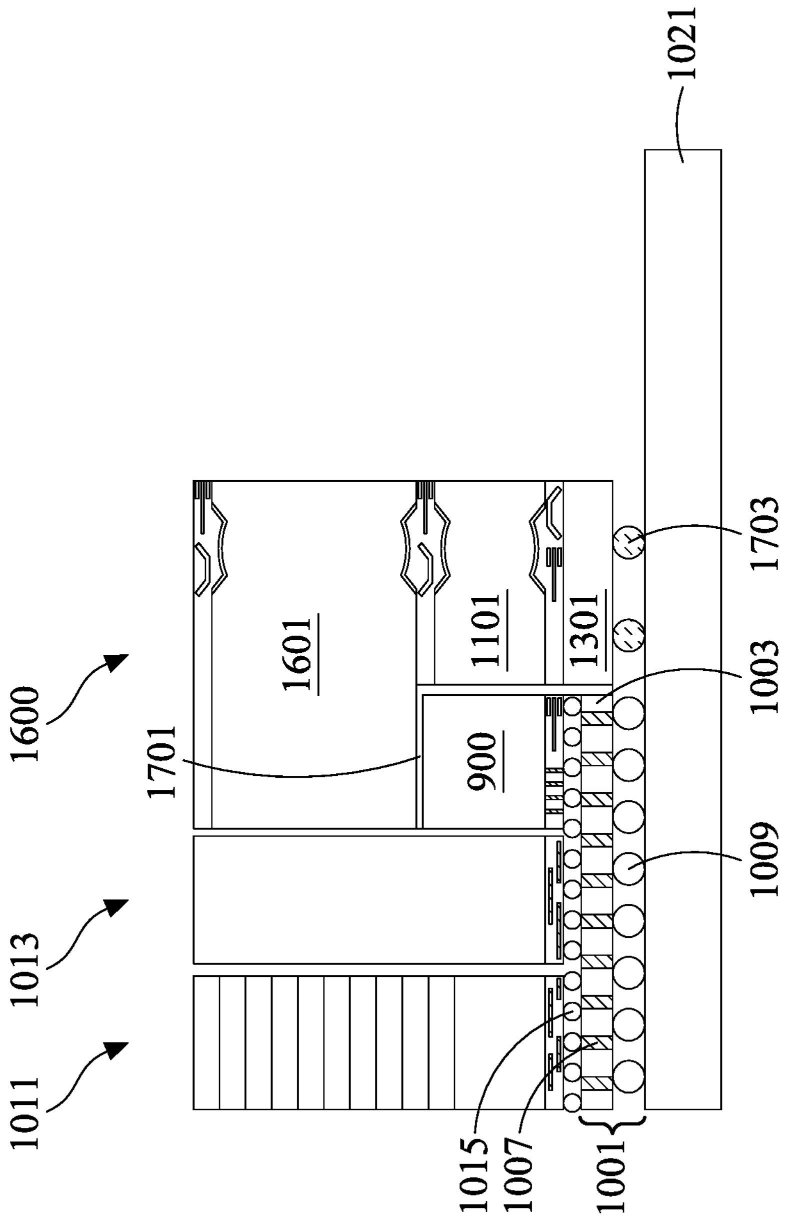
FIG. 17 illustrates an attachment of the multi-tier connection unit, in accordance with some embodiments.

FIG. 17 illustrates an attachment of the multi-tier connection unit 1600 to the second substrate 1021 and the first optical package 900. In an embodiment the multi-tier connection unit 1600 may be attached to the first optical package 900 using, e.g., an optical glue 1701. In some embodiments, the optical glue 1701 comprises a polymer material such as epoxy-acrylate oligomers, and may have a refractive index between about 1 and about 3. However, any suitable material may be utilized.

Additionally, the multi-tier connection unit 1600 may be attached to the second substrate 1021 in order to provide secondary support and help avoid warpage of the second substrate 1021. In an embodiment the multi-tier connection unit 1600 may be attached to the second substrate 1021 using first spacers 1703, which may be a rubber material, a soft and supportive polymer material, combinations of these, or the like. However, any suitable material may be utilized.

Figure 18A:
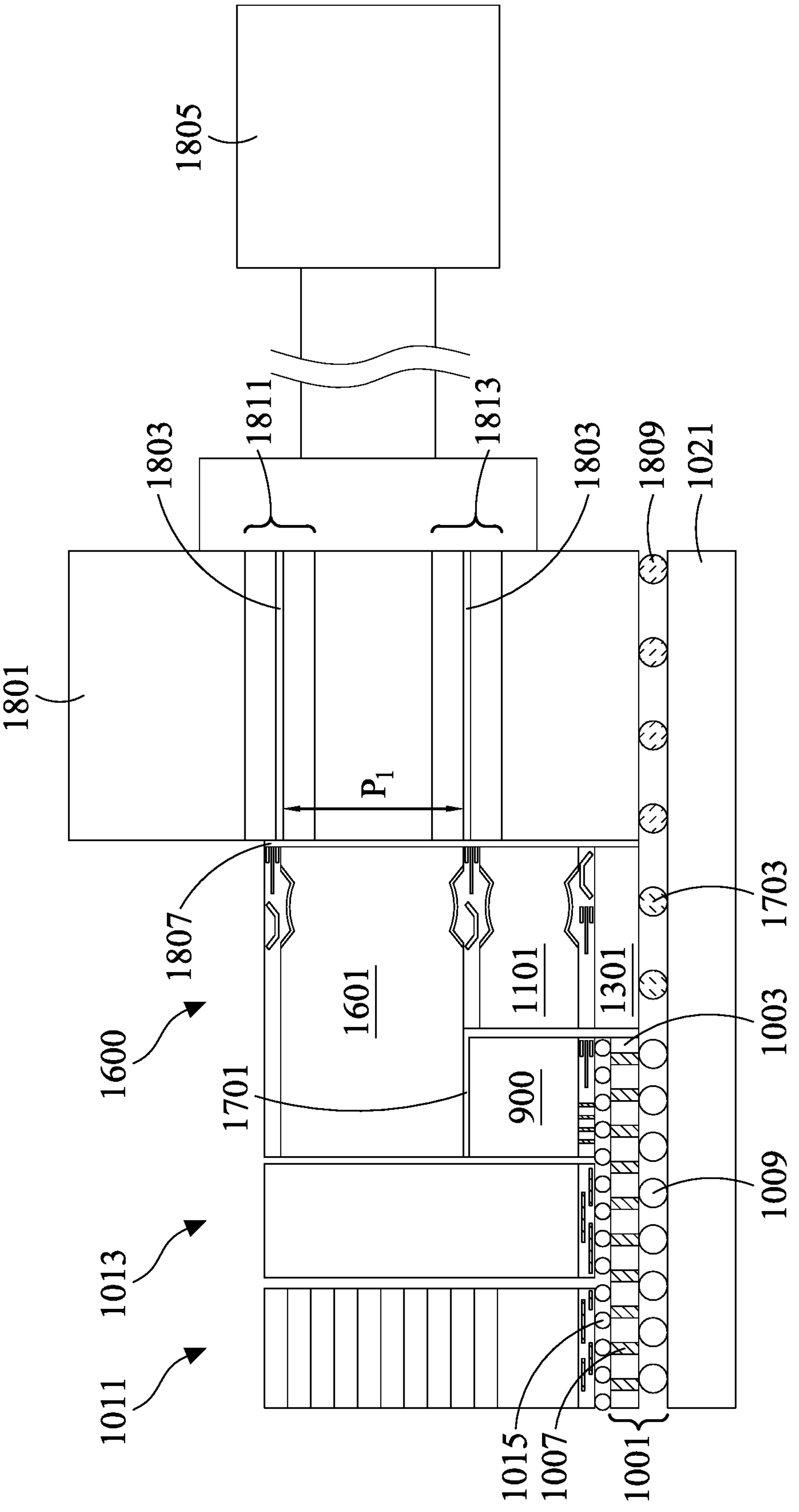
FIGS. 18A-18B illustrate attaching a multi-tier connection unit, in accordance with some embodiments.

FIG. 18A illustrates connection of optical fibers 1803 from a ferrule 1805 to the multi-tier connection unit 1600 using a multi-row connector 1801. In an embodiment each of the optical fibers 1803 may comprise a core material such as glass surrounded by one or more cladding materials. Optionally, a surrounding cover material may be used to surround the outer cladding material in order to provide additional protection.

In a particular embodiment the core material may have a thickness of about 10 μm. Additionally, the cladding material may have a thickness along one side of the core material of about 125 μm. However, any suitable dimensions may be utilized.

In an embodiment, the ferrule 1805 may be used to receive the plurality of optical fibers 1803 (from off of the figure), align the optical fibers 1803, and connect the optical fibers 1803 to the multi-row connector 1801. In an embodiment, the ferrule 1805 may be a mechanical transfer (MT) ferrule and the like made of a material that can be used to protect, support and align the individual optical fibers 1803. However, any suitable materials may be utilized. In an embodiment, the optical fibers 1803 may be inserted into openings located within the ferrule 1805. Once inserted, a glue material, such as an epoxy, silicone, a photocurable elastic polymer, combinations of these, or the like, may be injected or otherwise placed into the openings within the ferrule 1805 in order to secure the optical fibers 1803 within the ferrule 1805. Additionally, a curing process such as a light cure, a heat cure, or the like, may be utilized to harden the glue material. In this embodiment, the ferrule 1805 helps secure the optical fibers 1803 such that the optical signals provided by the optical fibers 1803 may be transmitted to the multi-tier connection unit 1600.

The multi-row connector 1801 receives the optical fibers 1803 from the ferrule 1805 and separates them into more than one row. In the particular embodiment illustrated in FIG. 18A, the more than one row comprises two rows of optical fibers 1803, such as a first row 1811 and a second row 1813. However, any suitable number of rows, such as three rows or four rows, may be utilized.

In an embodiment each of the individual rows of optical fibers 1803, once the multi-row connector 1801 is attached to the multi-tier connection unit 1600, are aligned with a corresponding tier within the multi-row connector 1801. In the particular embodiment in which two rows are utilized, the first row 1811 is aligned so that optical signals from the first row enter the eighth optical components 1609 of the third tier active layer 1607. Additionally, the second row 1813 is aligned so that optical signals from the second row enter the sixth optical components 1107 of the first tier active layer 1105. In a particular embodiment the first row 1811 may be separated from the second row 1813 by a first pitch $P_1$ of between about 250 μm and about 500 μm. However, any suitable distance may be utilized.

Once the multi-row connector 1801 is ready, the multi-row connector 1801 is connected to the multi-tier connection unit 1600 and the second substrate 1021. In an embodiment the multi-row connector 1801 may be attached to the multi-tier connection unit 1600 using, e.g., a second optical glue 1807 and a sidewall anti-reflective coating 1806. In some embodiments, the second optical glue 1807 and the sidewall anti-reflective coating 1806 may be formed using similar materials and methods as the optical glue 1701 and the first ARC 1113, described above with respect to FIG. 17 and FIG. 11A, respectively.

Additionally, the multi-row connector 1801 may be attached to the second substrate 1021 in order to provide secondary support and help avoid warpage of the second substrate 1021. In an embodiment the multi-row connector 1801 may be attached to the second substrate 1021 using second spacers 1809, which may be a rubber material, a soft and supportive polymer material, combinations of these, or the like. However, any suitable material may be utilized.

Figure 18B:
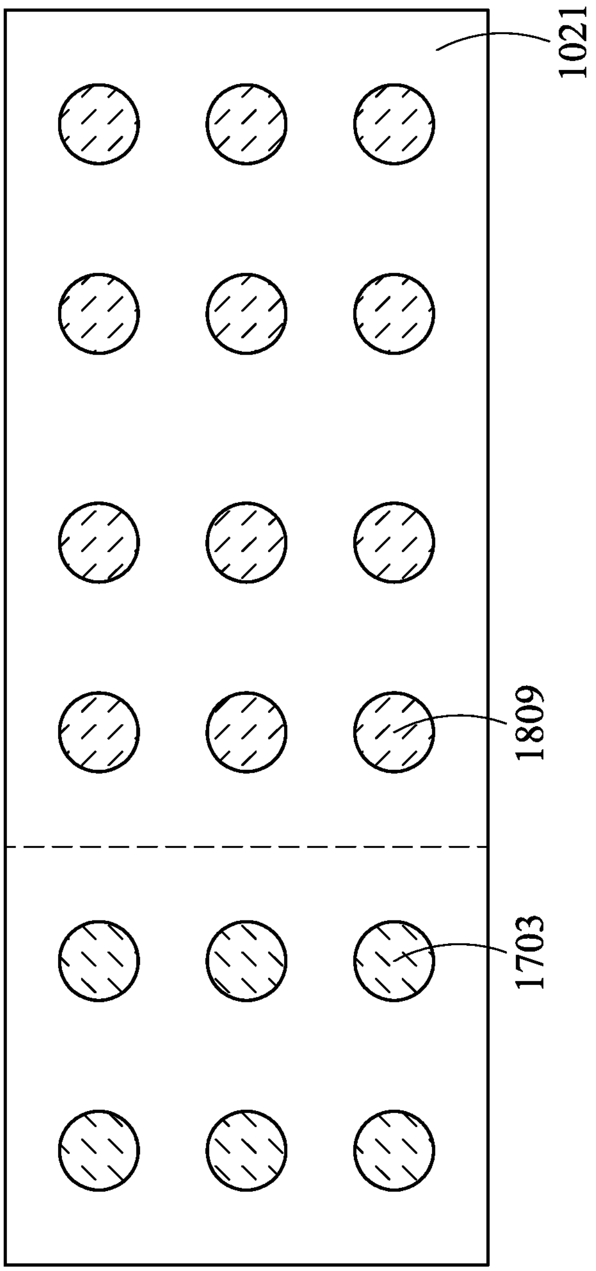

FIG. 18B illustrates a top down view the array of the first spacers 1703 and the second spacers 1809. In an embodiment the first spacers 1703 are located under the multi-tier connection unit 1600 (represented in FIG. 18B by being on the left side of the dashed line) while the second spacers 1809 are located under the multi-row connector 1801 (represented in FIG. 18B by being on the right side of the dashed line).

Figure 19:
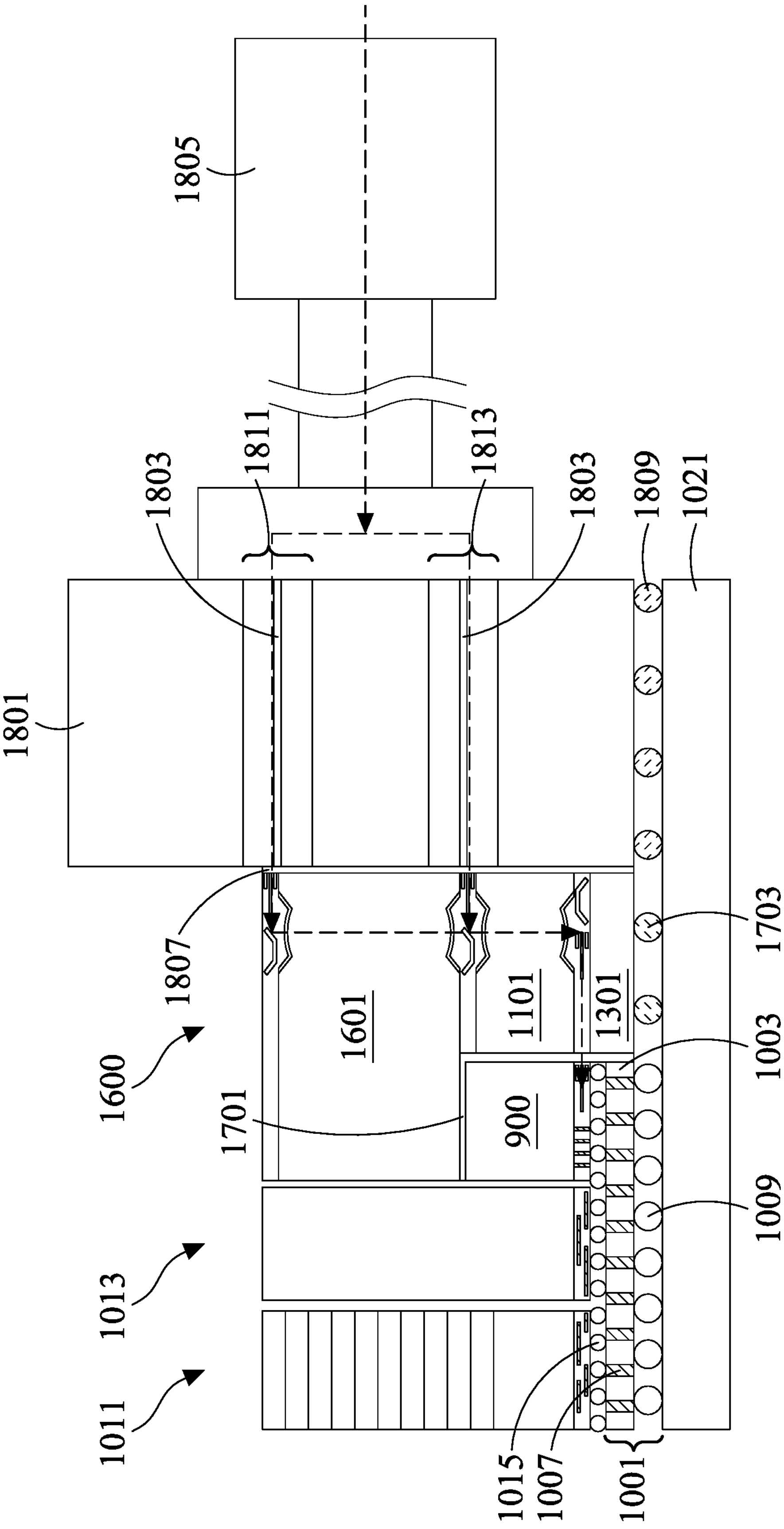
FIG. 19 illustrates paths of optical signals, in accordance with some embodiments.

FIG. 19 illustrates an operation of the optical signals (represented in FIG. 19 by the arrows with dashed lines), wherein the optical signals enter from the ferrule 1805 and then enter the multi-row connector 1801, wherein the optical signals are split into the first row 1811 and the second row 1813 within the multi-row connector 1801.

The optical signals from the second row 1813 enter the sixth optical components 1107 in the first tier active layer 1105, are reflected by the first mirror 1109 towards the second mirror 1207, and are reflected by the second mirror 1207 to enter the seventh optical components 1205 of the second tier active layer 1203. From the seventh optical components 1205, the optical signals can be routed into the first optical package 900 through, e.g., edge couplers located within the seventh optical components 1205 and the second active layer 801 of the fourth optical components 803.

Additionally, the optical signals from the first row 1811 enters the eighth optical components 1609 in the third tier active layer 1607, are reflected by the third mirror 1611, pass between separate elements of the first mirror 1109, and are reflected by the second mirror 1207 before entering the seventh optical components 1205 of the second tier active layer 1203. From the seventh optical components 1205, the optical signals can be routed into the first optical package 900 through, e.g., edge couplers located within the seventh optical components 1205 and the second active layer 801 of the fourth optical components 803.

By utilizing the multi-row connector 1801, more optical fibers 1803 can be connected to the first optical package 900.

In particular the third tier active layer 1607 may be used to ensure compatibility with the multi-row connector 1801, the first tier active layer 1105 is used to provide height to align with the various rows of the multi-row connector 1801 without the need for cutting substrates, and the second tier active layer 1203 is utilized to help ensure that the seventh optical components 1205 are precisely aligned with the couplers of the first optical package 900.

Additionally, by increasing the number of optical fibers 1803, this allows for a higher bandwidth both into and out of the first optical package 900. As such, coupling losses from the optical fibers 1803 to the first optical package 900 can be decreased and a more efficient device can be formed.

Figure 20A:
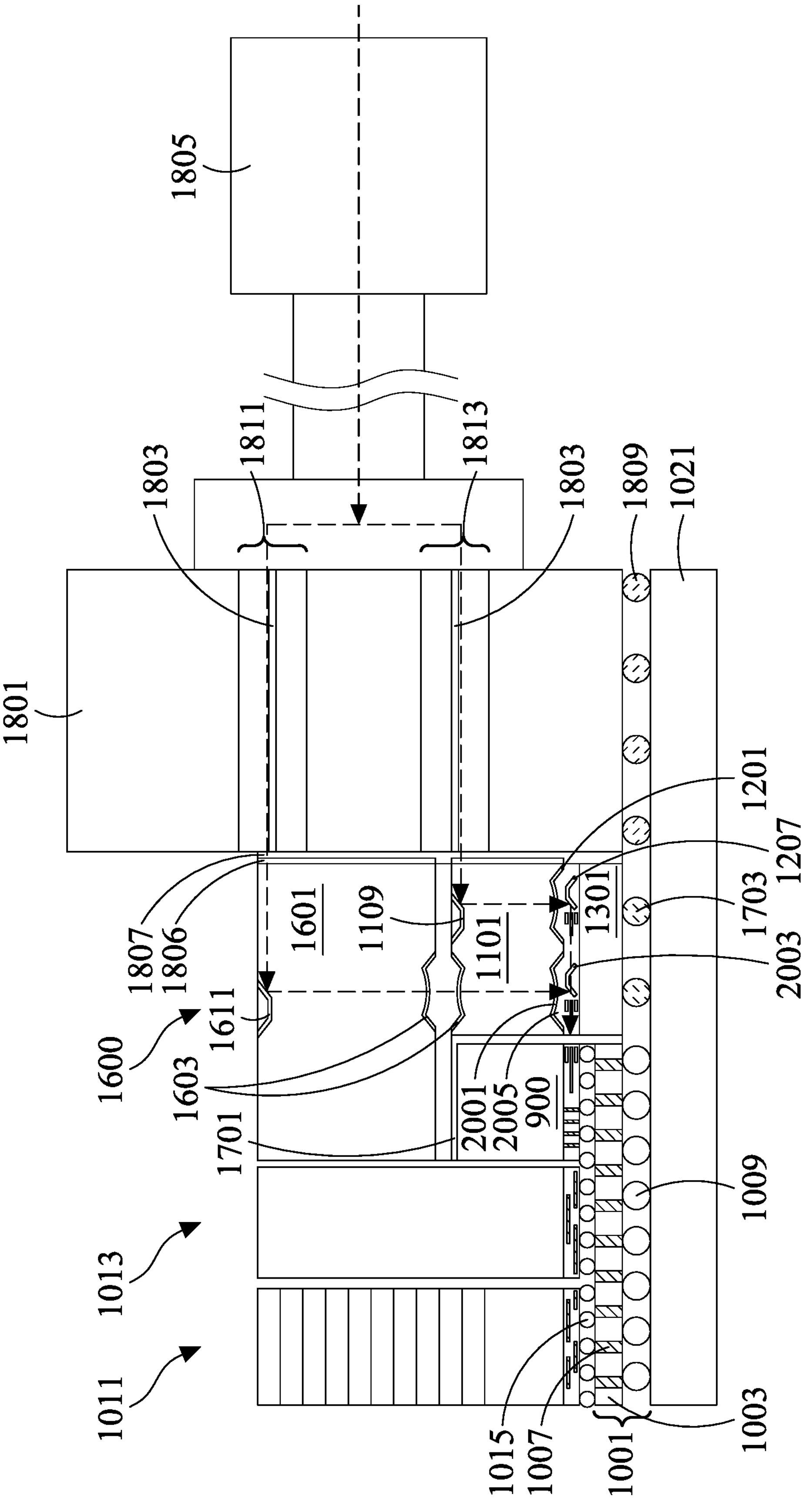
FIGS. 20A-20B illustrate a multi-tier connection unit without multiple levels of optical components, in accordance with some embodiments.

FIG. 20A illustrates another embodiment in which the sixth optical components 1107 and the eighth optical components 1609 are not formed. Looking first at the removal of the eighth optical components 1609, the eighth optical components 1609, the third tier active layer 1607, and the fourth lens 1605 are not formed during the manufacturing process as described above. Rather, the third mirror 1611 is formed directly within the third tier substrate 1601 using, e.g., similar processes as described above with respect to FIG. 16A, such as patterning an opening, lining the opening with reflective material, and removing undesired portions of the reflective material.

Additionally, the sixth optical components 1107 may also be removed and not manufactured during the formation of the first optical package 900, although the dielectric and/or cladding material may still be manufactured in order to assist in bonding. As such, the first mirror 1109 may be formed within the first tier substrate 1101 using, e.g., similar processes as described above with respect to FIG. 11A, such as patterning an opening, lining the opening with reflective material, and removing undesired portions of the reflective material.

Additionally in this embodiment the first mirror 1109 may not be located directly below the third mirror 1611, and the location of the first mirror 1109 may be offset from the location of the third mirror 1611. As such, the third lens 1603 and the first lens 1103 may further be offset from the location of the first mirror 1109 so as to be available for the transmission of optical signals from the third mirror 1611.

Looking at the second tier active layer 1203, in this embodiment the second lens 1201 and the second mirror 1207 may remain as discussed above in order to be able to reflect optical signals received from the first mirror 1109. In this embodiment, however, the second tier active layer 1203 may additionally include a fifth lens 2001 and a fourth mirror 2003. In an embodiment the fifth lens 2001 and the fourth mirror 2003 are used to receive reflected optical signals from the third mirror 1611 and reflect the optical signals into the seventh optical components 1205 of the second tier active layer 1203, and the fifth lens 2001 and the fourth mirror 2003 may be formed using similar methods and materials as the first lens 1103 and the first mirror 1109, described above with respect to FIG. 11A and, if desired a fifth ARC 2005 may be formed with the fifth lens 2001 using similar methods and materials as the first ARC 1113. However, any suitable materials and methods may be utilized.

Figure 20B:
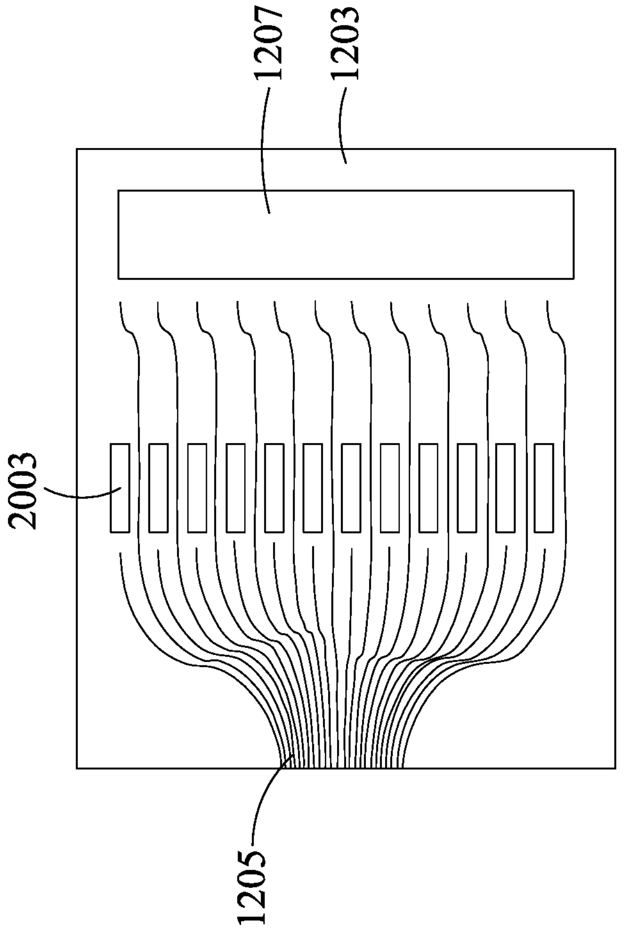

FIG. 20B illustrates a top down view of the second tier active layer 1203 in this embodiment. As can be seen in this embodiment, the second tier active layer 1203 comprises both the second mirror 1207 (which may be a single continuation structure) and the fourth mirror 2003 (which may comprise multiple, separate structures). As such, the seventh optical components 1205 (e.g., waveguides) receiving optical signals from the second mirror 1207 can pass between the separate sections of the fourth mirror 2003 to form a fan-in design and avoid inference between the individual components.

Returning to FIG. 20A, in operation the optical signals enter from the ferrule 1805 and then enter the multi-row connector 1801 where they are split into the first row 1811 and the second row 1813 within the multi-row connector 1801. The optical signals from the second row 1813 enters the first tier substrate 1101, are reflected by the first mirror 1109, and are reflected by the second mirror 1207 before entering the seventh optical components 1205 of the second tier active layer 1203. From the seventh optical components 1205, the optical signals are routed between elements of the fourth mirror 2003 (see FIG. 20B) and into the first optical package 900.

Additionally, the optical signals from the first row 1811 enters the third tier substrate 1601 and is reflected by the third mirror 1611. From the reflection from the third mirror 1611, the optical signal is reflected by the fourth mirror 2003 into the seventh optical components 1205 of the second tier active layer 1203. From the seventh optical components 1205, the optical signals are then routed into the first optical package 900.

Figure 21:
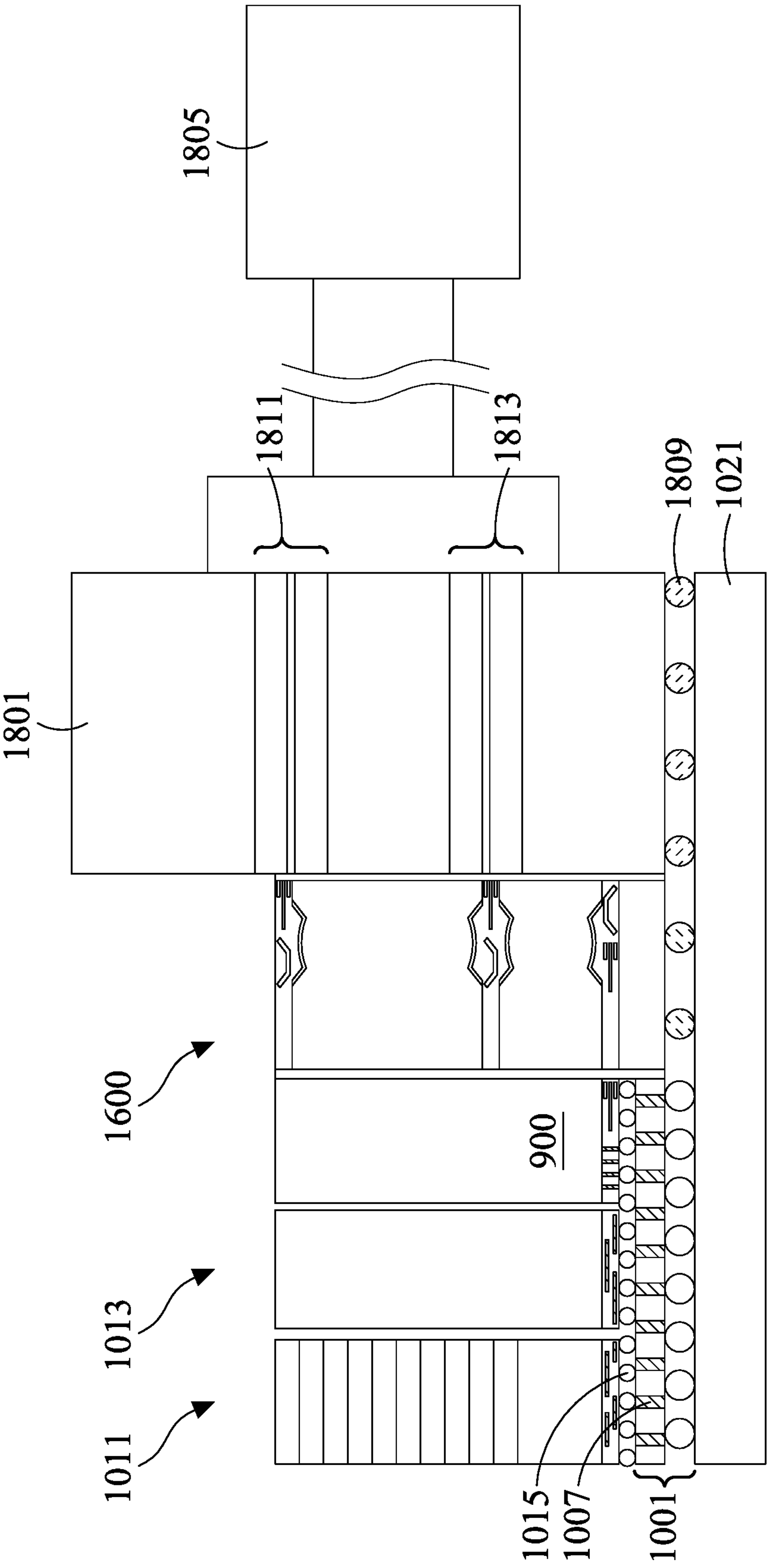
FIG. 21 illustrates a multi-tier connection unit with a constant width, in accordance with some embodiments.

FIG. 21 illustrates another embodiment which is similar to the embodiment discussed above with respect to FIG. 19. In this embodiment, however, the multi-tier connection unit 1600 has a constant width from a top of the multi-tier connection unit 1600 to a bottom of the multi-tier connection unit 1600. As such, the multi-tier connection unit 1600 may not extend over the first optical package 900, and the first optical package 900 may have a height that is planar with the second semiconductor device 1011 and the third semiconductor device 1013.

Figure 22:
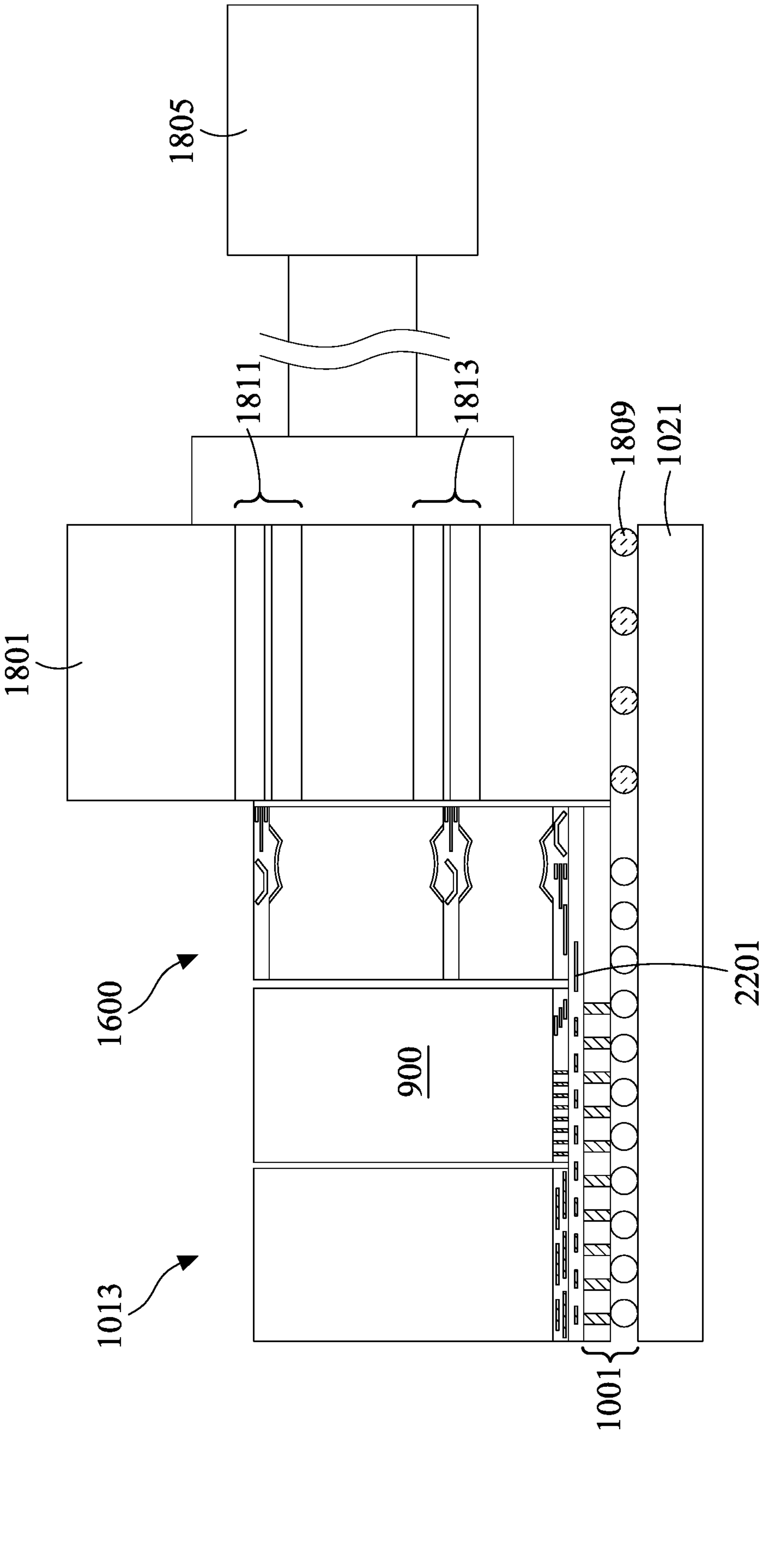
FIG. 22 illustrates a multi-tier connection unit with a constant width bonded to an interposer, in accordance with some embodiments.

FIG. 22 illustrates yet another embodiment similar to the embodiment in FIG. 21 (e.g., wherein the multi-tier connection unit 1600 has a constant width) but in which the multi-tier connection unit 1600 is bonded to the interposer substrate 1001 instead of the second substrate 1021. In this embodiment the multi-tier connection unit 1600 may be bonded to interposer substrate 1001 using a dielectric-to-dielectric bond instead of the first spacers 1703. The bonding process may be performed as described above with respect to FIG. 7, although any suitable bonding process may be utilized. A similar bonding process may be utilized in this embodiment to bond the first optical package 900, the second semiconductor device 1011 (if present and not separately illustrated in FIG. 22), and the third semiconductor device 1013. Such bonding allows for an easy integrated with, e.g., subsequently attached lids (not separately illustrated) for thermal dissipation.

Additionally in this embodiment, while the multi-tier connection unit 1600 may be optically connected to the first optical package 900 as described above (e.g. directly from the multi-tier connection unit 1600 to the first optical package 900), in other embodiments the multi-tier connection unit 1600 may be indirectly connected to the first optical package 900 through, e.g., the interposer optical components 2201 (described above with respect FIG. 9 but illustrated in FIG. 22). As such, the optical signals will travel from the seventh optical components 1205, through the interposer optical components 2201, and to the fifth optical components 911 to enter the first optical package 900.

Figure 23:
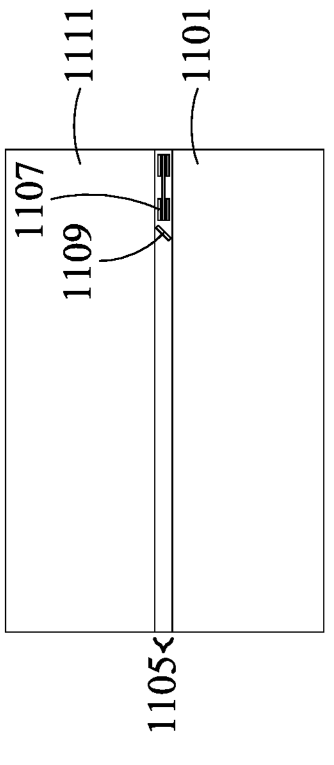
FIGS. 23-28D illustrate forming the first tier active layer over an optical interposer, in accordance with some embodiments.

FIG. 23 illustrates the beginning processes for manufacturing another embodiment in which the first tier active layer 1105 (formerly described as being part of the multi-tier connection unit 1600) is incorporated directly with the first optical package 900. In this embodiment the process may begin as described above with respect to FIG. 11A, wherein the first tier active layer 1105 with the sixth optical components 1107 and the first mirror 1109 are manufactured on the first tier substrate 1101 (without the first lens 1103) and then bonded to the first carrier substrate 1111 (using, e.g., bonding films). However, any suitable structure may be utilized.

Figure 24:
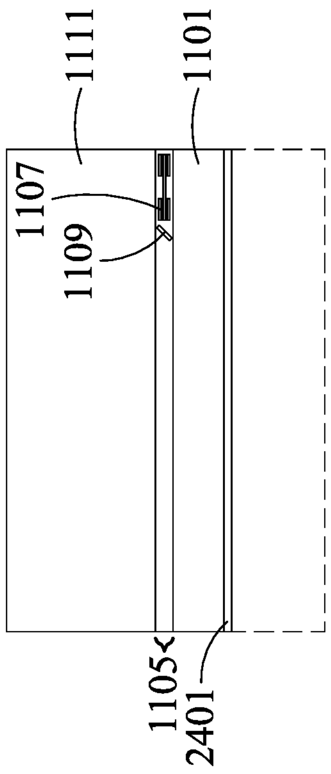

FIG. 24 illustrates that, once the first carrier substrate 1111 has been bonded to the first tier active layer 1105, the first tier substrate 1101 may be thinned. In an embodiment the first tier substrate 1101 may be thinned using one or more planarization processes, such as a chemical mechanical planarization process. However, any suitable method may be utilized.

After the first tier substrate 1101 has been thinned, a first bonding layer 2401 is deposited on the first tier substrate 1101. In an embodiment the first bonding layer 2401 may be a bonding material such as silicon oxide, silicon nitride, combinations of these, or the like, deposited using a method such as chemical mechanical polishing processes. However, any suitable method and material may be utilized.

Figure 25:
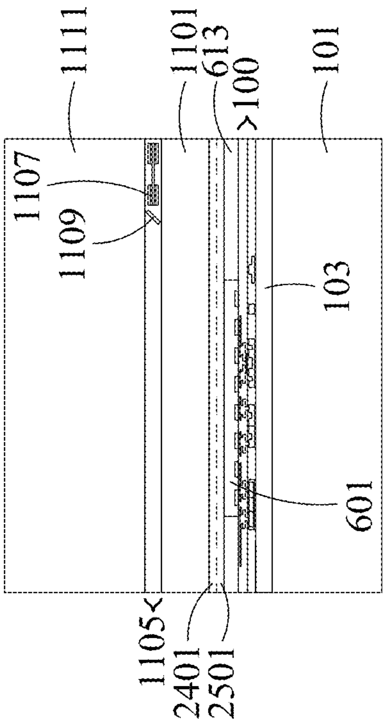

FIG. 25 illustrates that, once the first tier substrate 1101 has been thinned, the first tier substrate 1101 may be bonded to the structure of FIG. 7 (instead of the first support substrate 701 as illustrated in FIG. 7). For example, in some embodiments the first semiconductor device 601 is bonded and thinned and the first gap-fill material 613 is deposited and planarized as described above with respect to FIG. 7. However, any suitable processes may be utilized.

Once the gap fill material 613 has been deposited, a second bonding layer 2501 is deposited over the first semiconductor device 601 and the first gap-fill material 613. In an embodiment the second bonding layer 2501 may be similar to the first bonding layer 2401, such as by being silicon oxide deposited by chemical vapor deposition. However, any suitable methods and materials may be utilized.

Once the first bonding layer 2401 and the second bonding layer 2501 have been formed, the first bonding layer 2401 is bonded to the second bonding layer 2501. In an embodiment the first bonding layer 2401 and the second bonding layer 2501 may be bonded using a dielectric-to-dielectric bonding process. However, any suitable bonding process may be utilized.

Figure 26:
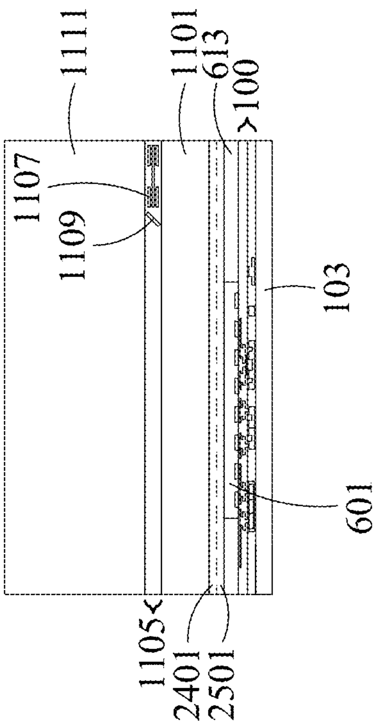

FIG. 26 illustrates that, once the first bonding layer 2401 and the second bonding layer 2501 have been bonded, the first substrate 101 is removed. In an embodiment the first substrate 101 may be removed using a planarization process, such as a chemical mechanical polishing process, a grinding process, one or more etching processes, combinations of these, or the like. However, any suitable method may be used in order to remove the first substrate 101.

Once the first substrate 101 has been removed, the second active layer 801 of the fourth optical components 803 are manufactured along a backside of the first active layer 201. In an embodiment, the second active layer 801 of the fourth optical components 803 may be manufactured as described above with respect to FIG. 8. However, any suitable methods may be utilized.

In this embodiment, however, in addition to forming the fourth optical components 803 within the second active layer 801, a fifth mirror 2701 is additionally formed within the second active layer 801. In an embodiment the fifth mirror 2701 may be formed in a similar manner and using similar materials as the first mirror 1109 described above with respect to FIG. 11A. However, any suitable methods and materials may be utilized.

Figure 27:
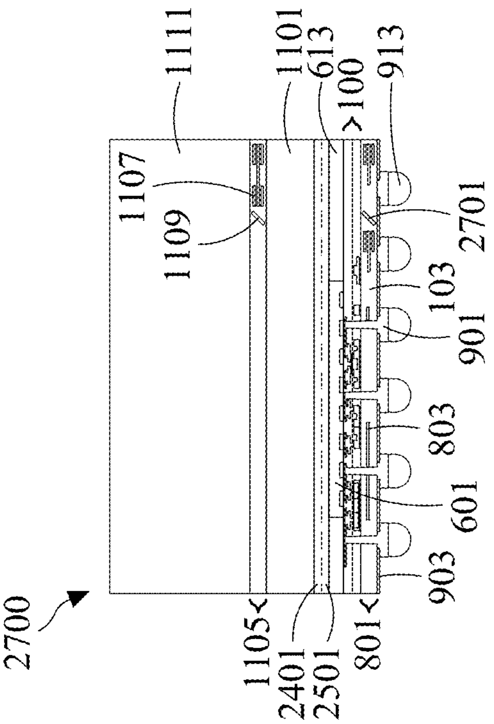

FIG. 27 additionally illustrates that, once the second active layer 801 with the fourth optical components and the fifth mirror 2701 have been manufactured, the first through device vias 901 and the third bonding layer 903 may be manufactured. Additionally, the first external connectors 913 may be formed to form a second optical package 2700. Any suitable structures may be utilized.

Figure 28A:
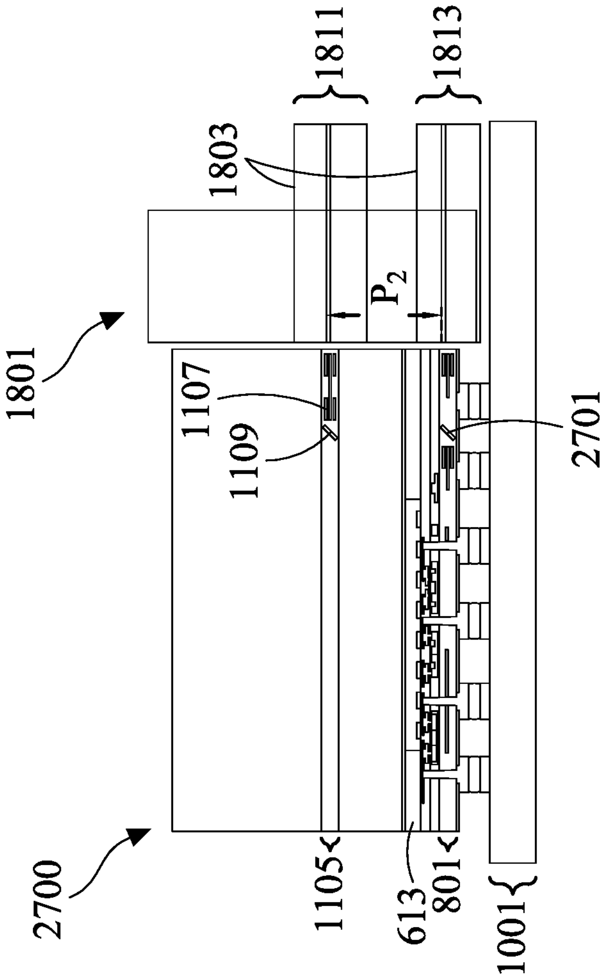

FIG. 28A illustrates that, once the second optical package 2700 has been prepared as described above, the second optical package 2700 may be bonded to the interposer substrate 1001 along with the multi-row connector 1801 (wherein the ferrule is not illustrated in FIG. 28A for clarity). In an embodiment the second optical package 2700 may be bonded as described above with respect to FIG. 10 while the multi-row connector 1801 may be bonded as described above with respect to FIG. 18A (e.g., with the use of the second spacers 1809). However, any suitable bonding process may be utilized.

In this embodiment the multi-row connector 1801 may be used to space the first row 1811 from the second row 1813 in order to align first row 1811 and the second row 1813 with the desired portions of the second optical package 2700. In a particular embodiment the first row 1811 and the second row 1813 may have a second pitch $P_2$ of between about 127 μm and about 250 μm. However, any suitable pitch may be utilized.

In operation, optical signals from the second row 1813 are directed directly into the second active layer 801 with the fourth optical components 803. However, the optical signals from the overlying first row 1811 are directed into the sixth optical components 1107 of the first tier active layer 1105, reflected off of the first mirror 1109 through the first gap-fill material 613 and to the fifth mirror 2701. The fifth mirror 2701 receives the optical signals and reflects them into the fourth optical components 803 of the second active layer 801.

Figure 28B:
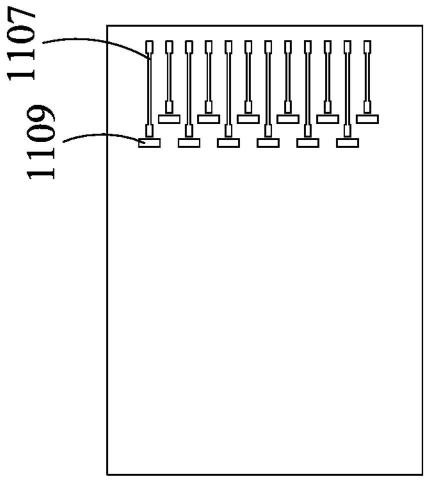

FIG. 28B illustrates a top down view of the first tier active layer 1105. As can be seen in this embodiment the first mirror 1109 may be formed in multiple discreet sections, wherein each section is aligned with an individual one of the sixth optical components 1107 of the first tier active layer 1105. In this embodiment the individual sections may be offset from each other, although in other embodiments the individual sections may all be in a single line. However, any suitable configuration may be utilized.

Figure 28C:
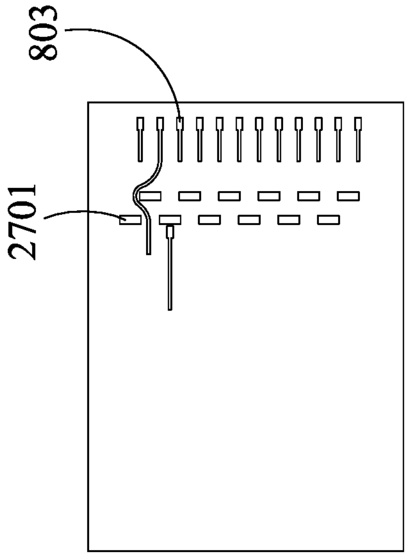

FIG. 28C illustrates a top down view of the second active layer 801 with the fourth optical components 803 and the fifth mirror 2701. As can be seen in this embodiment the fifth mirror 2701 may be arranged in a similar fashion as the first mirror 1109 (e.g., with individual sections offset from each other). Additionally, the fourth optical components 803 within the second active layer 801 may perform multiple functions, such as receiving optical signals directly from the second row 1813 and routing the optical signals around the fifth mirror 2701 (only one of which is illustrated for clarity) and also receiving signals that have been reflected from the fifth mirror 2701 (again, only one of which is illustrated for clarity). However, any suitable fourth optical components 803 with any desired routing may be utilized.

Figure 28D:
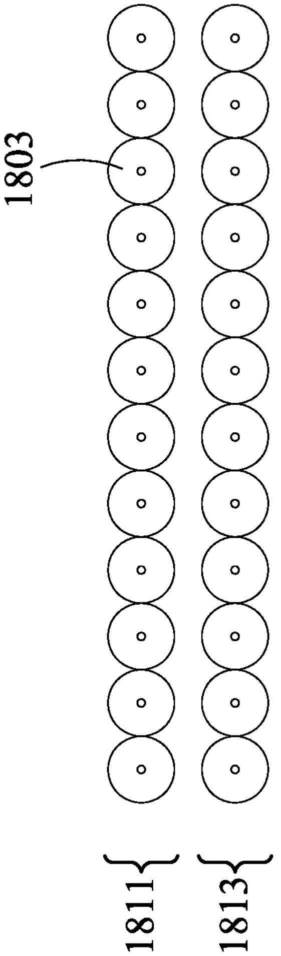

FIG. 28D illustrates a view of the optical fibers 1803 in both the first row 1811 and the second row 1813. In this embodiment the individual optical fibers 1803 are arranged in an array type layout where optical fibers 1803 in the first row 1811 are arranged to be located directly over respective optical fibers 1803 in the second row 1813. However, any suitable arrangement may be utilized.

Figure 29A:
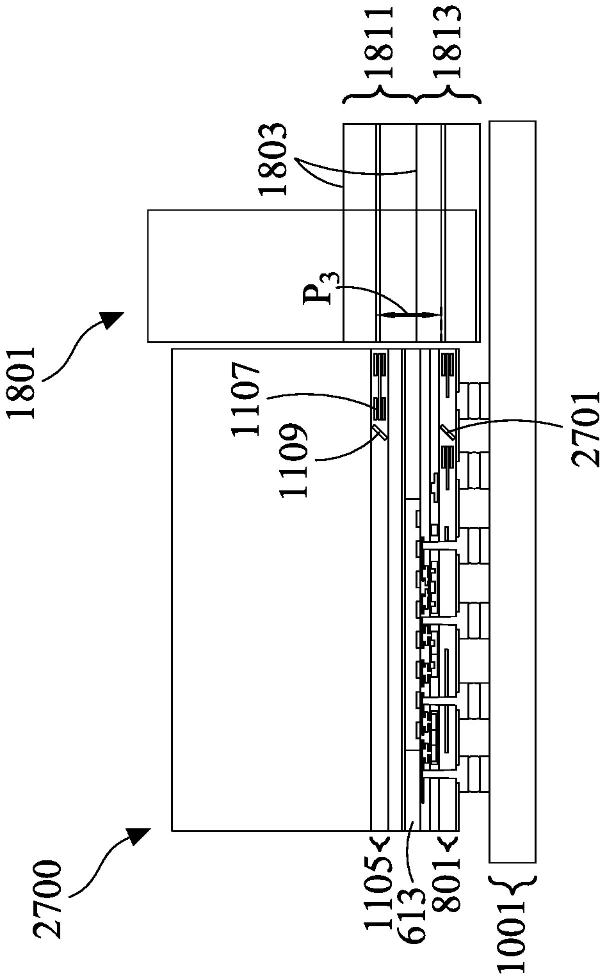
FIGS. 29A-29C illustrate an staggered optical fiber array, in accordance with some embodiments.
Figure 29B:
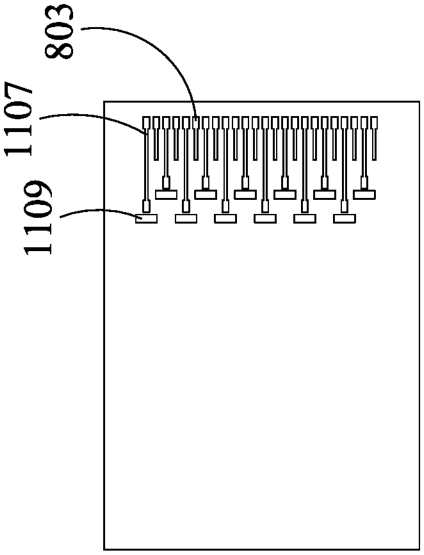
Figure 29C:
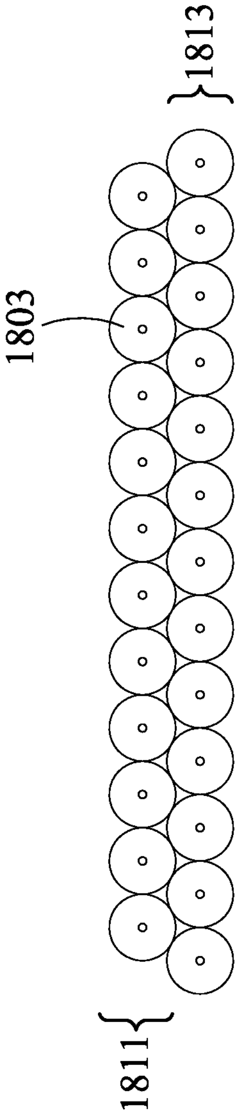

FIGS. 29A-29C illustrate yet another embodiment in which the optical fibers 1803 are arranged by the multi-row connector 1801 into a staggered type of formation. In this embodiment the individual optical fibers 1803, instead of being separated from each other, are instead arranged adjacent to each other. As such, the optical fibers 1803 in the first row 1811 and the optical fibers in the second row 1813 may have a third pitch $P_3$ of between about 127 μm and about 250 μm, such as about 108 μm. Additionally, the center of each of the optical fibers 1803 may be offset from the center of the optical fibers 1803 in an adjacent row.

FIG. 29B illustrates a top down view of portions of the first tier active layer 1105 and portions of the second active layer 801. As can be seen in this embodiment the first mirror 1109 may be formed in multiple discreet sections, wherein each section is aligned with an individual one of the sixth optical components 1107 of the first tier active layer 1105. Additionally, some of the fourth optical components 803 of the second active layer 801 may be interspersed below and between the individual ones of the sixth optical components 1107. However, any suitable configuration may be utilized.

FIG. 29C illustrates a view of the optical fibers 1803 in both the first row 1811 and the second row 1813. In this embodiment the individual optical fibers 1803 are arranged in a staggered type layout where optical fibers 1803 in the first row 1811 are adjacent to and possibly between respective optical fibers 1803 in the second row 1813. Additionally, centers of the optical fibers 1803 within the first row 1811 are offset from centers of the optical fibers 1803 within the second row 1813. However, any suitable arrangement may be utilized.

By utilizing the first tier active layer 1105 over the second active layer 801, more optical fibers 1803 can be connected. By increasing the number of optical fibers 1803, this allows for a higher bandwidth both into and out of the second active layer 801. As such, coupling losses from the optical fibers 1803 to the second active layer 801 can be decreased and a more efficient device can be formed.

In an embodiment, a method of manufacturing an optical device includes: receiving a multi-tier connection unit, the multi-tier connection unit including: a first tier comprising a first mirror with a first orientation; a second tier comprising a second mirror with a second orientation the same as the first orientation; and a third tier comprising a third mirror, the third mirror having a third orientation different from the first orientation; and attaching the multi-tier connection unit to a first optical package. In an embodiment the third tier further comprises fan-in waveguides. In an embodiment the second mirror comprises multiple, separated portions. In an embodiment the first mirror is a single unit. In an embodiment the multi-tier connection unit has a constant width. In an embodiment the first mirror is located with a semiconductor substrate. In an embodiment the first tier further comprises waveguides aligned with the first mirror.

In another embodiment, a method of manufacturing an optical device includes: attaching an electrical integrated circuit to an optical interposer; and bonding a first tier active layer over the electrical integrated circuit and the optical interposer, the first tier active layer including: first optical components; and a first mirror aligned with the first optical components. In an embodiment after the bonding the first mirror is aligned with a second mirror located on an opposite side of the electrical integrated circuit from the first mirror, the second mirror being located in a first active layer of second optical components. In an embodiment the method further includes attaching a multi-tier connection unit to the optical interposer. In an embodiment the multi-tier connection unit includes: a first optical fiber aligned with the first mirror; and a second optical fiber aligned with the second optical components. In an embodiment a first center of the first optical fiber is located directly over a second center of the second optical fiber. In an embodiment the first optical fiber is in a staggered configuration with the second optical fiber. In an embodiment a pitch between the first optical fiber and the second optical fiber is about 108 μm.

In yet another embodiment an optical device includes: a multi-tier connection unit, the multi-tier connection unit including: a first tier comprising a first mirror; a second tier comprising a second mirror, a first lens, and a second lens; and a third tier comprising a third mirror and a third lens; and a first optical package attached to the multi-tier connection. In an embodiment the first lens and the second lens are adjacent to the second mirror. In an embodiment the first lens and the second lens are offset from the second mirror. In an embodiment the third tier comprises a fourth mirror aligned with the first lens and the second lens. In an embodiment the optical device further includes a multiple row connector attached to the multi-tier connection unit, wherein a first row of optical fibers is aligned with the first mirror and wherein a second row of optical fibers is aligned with the second mirror. In an embodiment the first tier further comprises first optical components adjacent to the first mirror.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, the method comprising:
- receiving a multi-tier connection unit, the multi-tier connection unit comprising:
  - a first tier comprising a first mirror with a first orientation;
  - a second tier comprising a second mirror with a second orientation the same as the first orientation; and
  - a third tier comprising a third mirror, the third mirror having a third orientation different from the first orientation;
  - a first optical signal input; and
  - a first optical signal output;
- attaching the multi-tier connection unit to a first optical package, the first optical package comprising a semiconductor die; and
- attaching a multiple row connector to the multi-tier connection unit, wherein a first row of optical fibers is aligned with the first mirror and wherein a second row of optical fibers is aligned with the second mirror.

2. The method of claim 1, wherein the third tier further comprises fan-in waveguides.

3. The method of claim 1, wherein the second mirror comprises multiple, separated portions.

4. The method of claim 1, wherein the first mirror is a single unit.

5. The method of claim 1, wherein the multi-tier connection unit has a constant width.

6. The method of claim 1, wherein the first mirror is located within a semiconductor substrate.

7. The method of claim 1, wherein the first tier further comprises waveguides aligned with the first mirror.

8. A method of manufacturing a semiconductor device, the method comprising:

attaching an electrical integrated circuit to an optical interposer;

bonding a first tier active layer over the electrical integrated circuit and the optical interposer, the first tier active layer comprising:

first optical components comprising at least one waveguide; and a first mirror aligned with the first optical components; and attaching a multi-tier connection unit to the optical interposer, the multi-tier connection unit comprising:

a first optical fiber aligned with the first mirror; and a second optical fiber aligned with the second optical components.

9. The method of claim 8, wherein after the bonding the first mirror is aligned with a second mirror located on an opposite side of the electrical integrated circuit from the first mirror, the second mirror being located in a first active layer of second optical components.

10. The method of claim 8, wherein a first center of the first optical fiber is located directly over a second center of the second optical fiber.

11. The method of claim 8, wherein the first optical fiber is in a staggered configuration with the second optical fiber.

12. The method of claim 11, wherein a pitch between the first optical fiber and the second optical fiber is about 108 μm.

13. The method of claim 8, wherein the attaching the multi-tier connection unit to the optical interposer uses first spacers between the multi-tier connection unit and the optical interposer.

14. The method of claim 8, further comprising attaching a high bandwidth memory to the optical interposer.

15. A semiconductor device comprising:

a multi-tier connection unit, the multi-tier connection unit comprising:

a first tier comprising a first mirror;

a second tier comprising a second mirror, a first lens, and a second lens; and a third tier comprising a third mirror and a third lens; and a first optical package attached to the multi-tier connection unit with an optical glue, the first optical package comprising a semiconductor die; and a multiple row connector attached to the multi-tier connection unit, wherein a first row of optical fibers is aligned with the first mirror and wherein a second row of optical fibers is aligned with the second mirror.

16. The semiconductor device of claim 15, wherein the first lens and the second lens are adjacent to the second mirror.

17. The semiconductor device of claim 15, wherein the first lens and the second lens are offset from the second mirror.

18. The semiconductor device of claim 17, wherein the third tier further comprises a fourth mirror aligned with the first lens and the second lens.

19. The semiconductor device of claim 15, wherein the first tier further comprises first optical components adjacent to the first mirror.

20. The semiconductor device of claim 15, wherein the multi-tier connection unit is attached to an interposer with first spacers.

* * * * *